US012795456B2

(12) United States Patent
Soon-Shiong et al.

(10) Patent No.: US 12,795,456 B2
(45) Date of Patent: Nov. 10, 2026

(54) MULTI-BAND WIRELESS HALO DEVICES

(71) Applicant: Nant Holdings IP, LLC, Culver City, CA (US)

(72) Inventors: Patrick Soon-Shiong, Los Angeles, CA (US); Nicholas J. Witchey, Laguna Hills, CA (US); John Wiacek, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 19/638,047

(22) Filed: Apr. 2, 2026

(65) Prior Publication Data

US 2026/0313468 A1 Oct. 8, 2026

Related U.S. Application Data

(60) Provisional application No. 63/782,818, filed on Apr. 3, 2025.

(51) Int. Cl.

| | |
|---|---|
| ***H04W 72/53*** | (2023.01) |
| ***H04W 28/20*** | (2009.01) |
| ***H04W 72/543*** | (2023.01) |

(52) U.S. Cl.

CPC .......... *H04W 28/20* (2013.01); *H04W 72/53* (2023.01); *H04W 72/543* (2023.01)

(58) Field of Classification Search

None

See application file for complete search history.

(56) References Cited

U.S. PATENT DOCUMENTS

| | | | | |
|---|---|---|---|---|
| 2006/0083205 | A1 | 4/2006 | Buddhikot et al. | |
| 2009/0141660 | A1 | 6/2009 | Hassan et al. | |
| 2011/0058547 | A1 * | 3/2011 | Waldrop | G06Q 30/0611 370/389 |
| 2012/0115518 | A1 | 5/2012 | Zeira et al. | |
| 2017/0111826 | A1 * | 4/2017 | Sankar | H04W 28/20 |
| 2020/0160339 | A1 * | 5/2020 | Patel | G06Q 20/405 |
| 2022/0124170 | A1 | 4/2022 | Shribman et al. | |
| 2024/0064138 | A1 | 2/2024 | Jain et al. | |

OTHER PUBLICATIONS

International Patent Application No. PCT/US2026/022186, International Search Report and Written Opinion mailed on Jul. 30, 2026, 11 pages.

* cited by examiner

*Primary Examiner* — The Hy Nguyen

(74) *Attorney, Agent, or Firm* — Kilpatrick Townsend & Stockton LLP

(57) ABSTRACT

Techniques include instantiating a communication policy for a plurality of wireless interfaces. The communication policy includes a peer device handshake protocol over at least some interfaces of the plurality of wireless interfaces, connection bandwidth criteria over the plurality of wireless interfaces; connection range criteria over the plurality of wireless interfaces, and transmission constraints over the plurality of wireless interfaces. The techniques further include establishing a connection with at least one peer device via the plurality of wireless interface based on the peer device handshake protocol and satisfying the bandwidth connection criteria and the range connection criteria. The techniques further include exchanging at least one data packet over the connection via the plurality of wireless interfaces according to the transmission constraints.

20 Claims, 5 Drawing Sheets

MULTI-BAND WIRELESS HALO DEVICES

CROSS REFERENCE TO RELATED APPLICATIONS

This application is a continuation of U.S. Provisional Application No. 63/782,818, filed Apr. 3, 2025 titled "Multi-Band Wireless Halo Devices," the content of which is herein incorporated by reference in its entirety for all purposes.

FIELD OF THE INVENTION

The field of the invention generally relates to inter-device communication techniques.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

Embodiments of the present disclosure provide apparatuses, systems, and methods in which communication between communication devices can be established using one or more communication interfaces. The communication interfaces may enable for many and multiple communications to be received and/or sent by a communication device with multiple communication interfaces. The communication interfaces may transmit data across varying distances, use varying energy, use varying frequency bands for communication, and/or use varying communication protocols, etc. The techniques described herein enable a communication device network to be established in a flexible manner.

In an embodiment, a wireless halo device comprises at least one computer readable non-transitory memory storing software instructions, a plurality of wireless interfaces wherein each wireless interface may correspond to a different wireless frequency band, and at least one processor coupled with the at least one memory and the plurality of wireless interfaces. The processor(s) may execute software instructions to instantiate a communication policy for the plurality of wireless interfaces in the at least one memory. The communication policy may include a peer device handshake protocol that operates over at least some interfaces of the plurality of wireless interfaces, connection bandwidth criteria over the plurality of wireless interfaces, connection range criteria over the plurality of wireless interfaces, and transmission constraints over the plurality of wireless interfaces. The processor(s) may execute software instructions to further cause a connection to be established with at least one peer device via the plurality of wireless interface based on the peer device handshake protocol and satisfying the bandwidth connection criteria and the range connection criteria. The processor(s) may execute software instructions to further cause exchanging at least one data packet over the connection via the plurality of wireless interfaces according to the transmission constraints.

Various objects, features, aspects and advantages of the inventive subject matter will become more apparent from the following detailed description of preferred embodiments, along with the accompanying drawing figures in which like numerals represent like components.

DEFINITIONS

Figure 1:
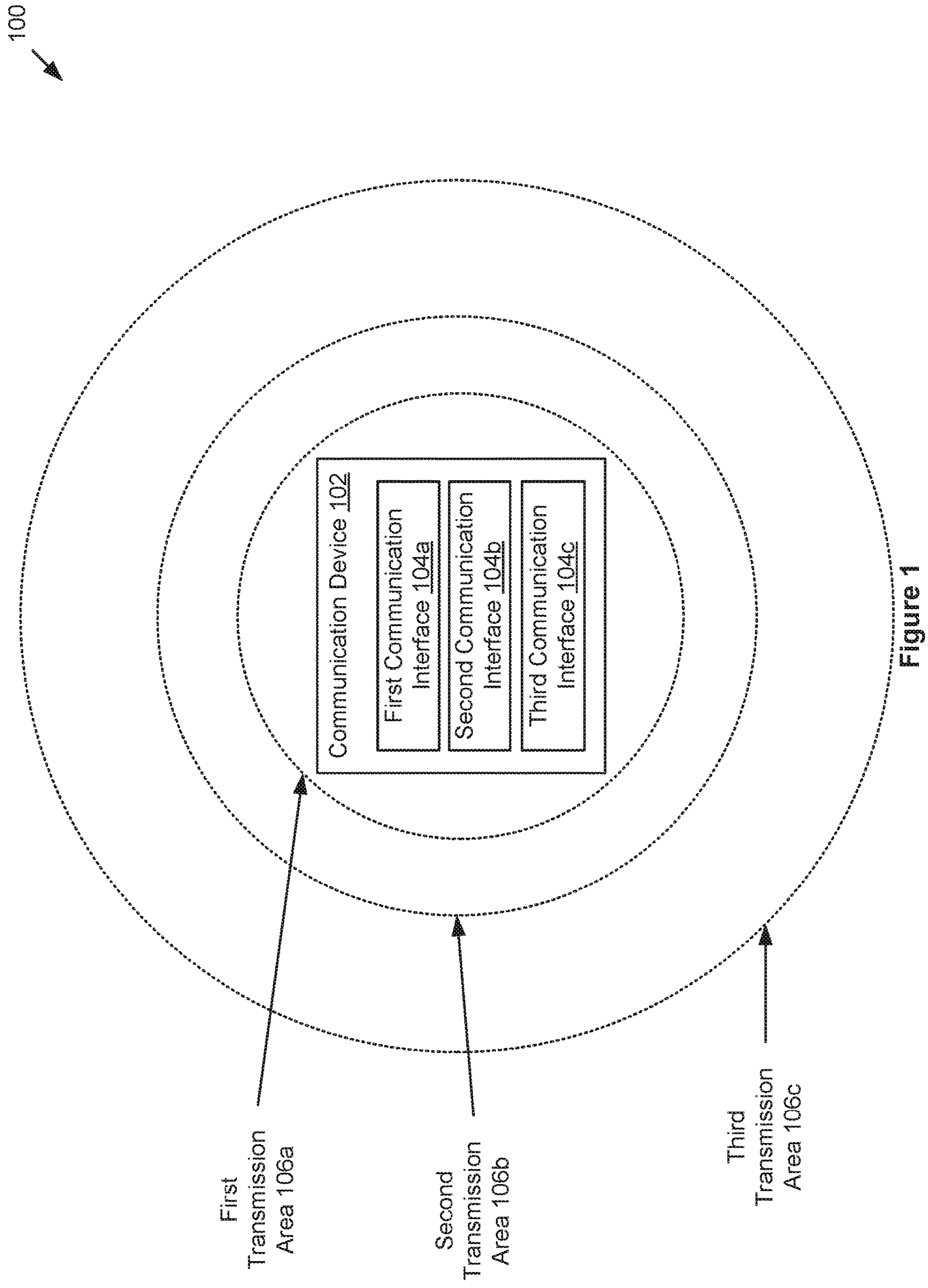
FIG. 1 illustrates a block diagram of a communication device according to certain embodiments, in accordance with the present disclosure.

A halo device can be a communication device that can be considered to have a halo of wireless communication potential across multiple frequency bands, ranges, and bandwidths. The communication device may be configured to communicate with one or more other devices (e.g., a halo device, a mobile phone, a tablet, a laptop, an RFID access card, an earbud, a drone, and/or a headset, a repeater, a router, a base station, a vehicle, a set top box, an appliance, a wearable device, a biometric device, a personal area network (PAN) device, and/or a game console, etc.) using wireless and/or wired communication techniques. The halo device may include one or more communication interfaces. The communication interfaces may enable the halo device to communicate with one or more other devices. A communication interface may be configured to communicate using one or more frequency bands/bands/channels that include a specific range of electromagnetic frequencies. The halo device may be configured to transmit halo communication and/or aura communication. The halo device may be configured to transmit aura communication and/or receive aura communications.

Halo communication can refer to bidirectional communication. Bidirectional communication can be a type of data transmission where information flows in both directions between sender and receiver, allowing for interaction and feedback. Halo communication can occur either simultaneously (full-duplex) where both parties can send and receive data at the same time, or alternately (half-duplex) where communication happens one direction at a time. Bidirectional communication can be useful in interactive systems, enabling real-time responses, better coordination, and/or error correction. Examples of halo communication may leverage one or more types of communications including, but not limited to, a transmission control protocol (TCP), a user datagram protocol (UDP), internet protocol (IP), a Bluetooth protocol, or a Zigbee protocol, etc.

Aura communication, within the context of a halo device, can refer to unidirectional communication. For example, a halo device can be considered to generate an aura of wireless communication where the aura provides information unidirectionally to other devices or other halo device. The unidirectional communication may include a transmission or a reception of a signal (e.g., a data packet). Unidirectional communication is a type of data transmission where information flows in only one direction, without any response or feedback from the receiver. In this mode, a sender transmits data to a receiver, but the receiver cannot and/or does not send data back to the sender. Aura communication can include a broadcast signal sent without a specified recipient. Aura communication can include a signal transmitted with a specified recipient. Examples of aura communication protocols include, but are not limited to, a radio broadcast, a television broadcast, and/or a global positioning system (GPS) signal, etc.

A link can refer to a communication link between two devices. The link can be the physical or wireless connection that enables data exchange between the two devices communication interfaces. The link can serve as the medium through which signals, messages, or data packets are transmitted and/or received. Communication links can be wired, using physical cables such as Ethernet, fiber optics, or serial connections, or wireless, relying on technologies like Wi-Fi, Bluetooth, radio waves, lasers, audio, light or infrared signals. The quality and efficiency of a communication link depend on factors such as signal strength, bandwidth, interference, and protocol compatibility. For instance, in a mobile network, a smartphone establishes a communication link with a nearby cell tower to send and receive voice calls, texts, or internet data. Similarly, in a Bluetooth setup, a communication link between a smartphone and a wireless speaker enables audio transmission. Multiple links can be established between a communication device and another device as part of a single connection between the communication device and the other device. Multiple links can be established between a communication device and multiple respective devices.

DETAILED DESCRIPTION

The present application relates to a communication device that includes multiple communication interfaces for communicating using multiple communication frequency bands. The communication device may be configured to communicate with one or more other devices which may or may not also have multiple communication interfaces. By creating a network of devices with at least one of which including multiple communication interfaces, capabilities and flexibility of the network can be improved by providing flexible communication management among multiple wireless channels have varied bandwidths and range.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer-readable storage medium (e.g., hard drive, FPGA, PLA, solid state drive, RAM, flash, ROM, etc.). The software instructions or suite of software instructions configure or program the computing device or their processors to provide the roles, responsibilities, or other functionality as discussed below with respect to the disclosed apparatus or systems. Further, the disclosed technologies can be embodied as a computer program product that includes a non-transitory computer-readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial operation protocols, or other electronic information exchanging methods. Data exchanges among devices can be conducted over a packet-switched network, the Internet, LAN, WAN, VPN, or other type of packet switched network; a circuit switched network; cell switched network; or other type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated the combination of software and hardware working in concert create a dedicated set of physical, real-world structures that provide utility to one or more users that would not exist outside the scope of the physical, real-world assets.

In the following description, various embodiments of the present disclosure will be described. For purposes of explanation, specific configurations and details are set forth in order to provide a thorough understanding of the embodiments. However, it will also be apparent to one skilled in the art that embodiments may be practiced without the specific details. Furthermore, well-known features may be omitted or simplified in order not to obscure the embodiment being described.

In an embodiment, a wireless halo device comprises at least one computer readable non-transitory memory storing software instructions, a plurality of wireless interfaces wherein each wireless interface may correspond to a different wireless frequency band, and at least one processor coupled with the at least one memory and the plurality of wireless interface. The processor(s) may execute software instructions to instantiate a communication policy for the plurality of wireless interfaces in the at least one memory. The communication policy may include a peer device handshake protocol over at least some interfaces of the plurality of wireless interfaces, connection bandwidth criteria over the plurality of wireless interfaces, connection range criteria over the plurality of wireless interfaces, and transmission constraints over the plurality of wireless interfaces. The processor(s) may execute software instructions to further cause a connection to be established with at least one peer device, possibly fungible peer devices, via the plurality of wireless interface based on the peer device handshake protocol and satisfying the bandwidth connection criteria and the range connection criteria. The processor(s) may execute software instructions to further cause exchanging at least one data packet over the connection via the plurality of wireless interfaces according to the transmission constraints.

Embodiments described herein can enable multiple communication interfaces to operate in coordination across similar, or even fungible, devices which can facilitate establishing seamless communication connections that incorporate one or more data channels/links. These technologies can allow devices to interact dynamically with one another, with less proximity restrictions, leveraging various transmission ranges and frequency bands to ensure robust connectivity. Additionally, devices described herein may be used to form a mesh network (e.g., a decentralized network architecture where devices connect directly to one another to exchange data), enhancing network resilience and scalability. Further, these devices can also integrate and interact with pre-existing networks, ensuring compatibility and expanding the scope of their communication capabilities. In certain embodiments, devices can maintain effective communication even as the device moves and/or another device moves, allowing for more sustained connectivity in dynamic environments.

Certain embodiments improve the functionality, scalability, and/or efficiency of communication systems. By enabling coordination across multiple communication interfaces, devices can maintain seamless connections even when switching between data channels or frequency bands, reducing signal interruptions and may improve reliability of communication in dynamic/changing environments. The ability to operate dynamically across various ranges/distances and frequency bands further improves connectivity based on proximity and environmental conditions, such as by improving signal strength and/or reducing latency for better overall network performance. Thus, data may be exchanged over channels have appropriate ranges and/or bandwidths as dictated by transmission constraints.

Additionally, the capability to form decentralized mesh networks with devices that use multiple communication interfaces enhances network resilience and scalability, as devices can communicate directly and reroute data to different nodes and/or different communication interfaces dynamically in response to node failures, changes in topology, and/or environment changes. Embodiments can also integrate with pre-existing networks, extending the functionality of legacy systems while enabling smooth transitions to newer technologies (e.g., bands, protocols, hardware, etc.). Coordinating multiple interfaces and data channels can improve resource allocation (e.g., maximizing bandwidth utilization and minimizing congestion). Furthermore, embodiments may enhance data security and privacy by minimizing risks associated with centralized points of failure or interception.

Turning now to the figures, FIG. 1 illustrates a block diagram 100 of a communication device 102 according to certain embodiments, in accordance with the present disclosure. The communication device 102 may also be referred to as a halo device. Block diagram 100 shows the communication device 102 may be capable of transmitting signals within certain signal transmission ranges. Further, block diagram 100 shows communication device 102 may be configured to sense other devices within a whisker distance 108.

The communication device 102 may include one or more communication interfaces, such as a first communication interface **104*a* (e.g., Bluetooth, etc.), a second communication interface 104*b* (e.g., 802.11, etc.), and/or a third communication interface 104*c* (e.g., 5G, LoRa, etc.). In certain embodiments, the communication device 102 includes more or less interfaces than what is shown in the block diagram 100**. Each interface may have a corresponding maximum bandwidth, a maximum range, or other operational attributes.

The first communication interface **104*a* can enable data exchange (e.g., transmission and/or receiving) between the communication device 102 and another device using specific transmission methods and/or frequency bands. The data exchange may occur via a link between the communication device 102** and the other device. A transmission method may include techniques used to transmit signals over a band. Transmission methods can refer to techniques used to send signals over a band, whereas frequency bands can specify the range of an electromagnetic (EM) spectrum used for transmission. Examples of transmission methods include a radio frequency (RF) transmission, a light transmission (e.g., infrared light, visible light, ultraviolet light, a laser, etc.), a microwave transmission, an infrared (IR) transmission, a laser-based modulated protocol, a Bluetooth protocol, a Wi-Fi protocol, a near field communication (NFC) protocol, a Long Range (LoRa) protocol, a wireless USB (W-USB) protocol, a Bluetooth Low Energy (BTLE) protocol, a wireless gigabit (WiGIG) protocol (e.g., 802.11ad), a Zigbee protocol, a Z-Wave protocol, a visible light communication (VLC) protocol, and/or a light fidelity (LiFi) protocol, etc. Transmission methods may include wired and/or wireless transmission methods.

A transmission method may may be configured to operate within one or more bands. For example, a Bluetooth transmission method is performed using a 2.4 GHz band. As another example, a Wi-Fi transmission method may use radio waves to communicate in the 2.4 GHz and/or 5 GHz bands.

Additional examples electromagnetic frequency bands include a very low frequency (VLF) (e.g., 3 kHz-30 kHz frequency with a wavelength of 100 km-10 km), low-frequency (LF) (e.g., 30 kHz-300 kHz frequency with a wavelength of 10 km-1 km), medium frequency (MF) (e.g., 300 kHz-3 MHz frequency with a wavelength of 1 km-100 m), high-frequency (HF) (e.g., 3 MHz-30 MHz frequency with a wavelength of 100 m-10 m), very high-frequency (VHF) (e.g., 30 MHz-300 MHz frequency with a wavelength of 10 m-1 m), ultra-high-frequency (UHF) (e.g., 300 MHz-3 GHz frequency with a wavelength of 1 m-100 mm), super high frequency (SHF) (e.g., 3 GHz-30 GHz frequency with a wavelength of 100 mm-10 mm), and/or extremely high frequency (EHF) (e.g., 30 GHz-300 GHz frequency with a wavelength of 10 mm-1 mm). Additionally, or alternatively, laser-based communications may employ lasers having wavelengths from infrared (e.g., 800 nm to 1600 nm, greater than 1600 nm, etc.), to visible light (e.g., about 380 nm to 750 nm, etc.), and even to ultraviolet light (e.g., less than 380 nm, etc.). Lasers can provide for direct line of sight communications, which may be more secure, require less energy, and/or provide for longer range communications.

A band may be classified as an L-band (1-2 GHz frequency), an S-band (2-4 GHz frequency), a C-band (4-8 GHz frequency), an X-band (8-12 GHz frequency), a Ku-band (12-18 GHz frequency), a Ka-band (26-40 GHz frequency), a V-band (40-75 GHz frequency), an E-band (71-86 GHz frequency), a citizens broadband radio service (CBRS) which is a free spectrum band operating at 3550 MHz-3700 MHz.

Lower frequencies may travel farther and penetrate obstacles better, whereas higher frequencies may support faster data rates but may have shorter ranges. Additionally, communication interfaces may use different modulation techniques (e.g., amplitude modulation (AM), frequency modulation (FM), and/or Quadrature Amplitude Modulation (QAM)) to optimize performance based on environmental conditions and distance. Some techniques, like Wi-Fi, can support multiple frequency bands (2.4 GHz and 5 GHz) to allow flexibility in balancing speed and coverage. Depending on the power and techniques, communication can occur over short distances, such as NFC (a few centimeters), or long distances, such as satellite communication (e.g., uplink, downlink, satellite to satellite, etc.), which can span thousands of kilometers possibly via laser.

The first communication interface 104*a* may be selected for use by the communication device 102 based on an application running on the communication device 102 and/or requirements of the application. For example, the application may cause a communication interface to be used that can support connection range criteria, such as transmitting signals up to 100 meters instead of up to 1 meter. In an example, the application may cause a communication interface to be used that can support connection bandwidth criteria, such as transmitting signals with a defined amount of data at a defined speed, a data rate, (e.g., 1 GB/s versus 1 gb/s). In certain embodiments, the first communication interface 104*a* is capable of exchanging data (e.g., sending and/or receiving) using a first band or a second band and can be used to exchange data using either one of the bands or both of the bands. Further, lasers-based interfaces may reach up to 200 Gbps; for example, the NASA TeraByte InfraRed Delivery (TBIRD) system is able to achieve 200 Gbps with wavelength from 750 nm-1400 nm in Near Infrared to Mid-Wave infrared from about 3.0 um to 8.0 um.

The second communication interface 104*b* may operate in a similar manner as the first communication interface 104*a*. The second communication interface 104*b* may be configured to be used by a same or different application as the first communication interface 104*a*. The second communication interface 104*b* may be configured to be used to exchange data using a different band than the first communication interface 104*a*. The third communication interface 104*c* may operate in a similar manner as the first communication interface 104*a*. The third communication interface 104*c* may be configured to be used by a same or different application as the first communication interface 104*a*. The third communication interface 104*c* may be configured to be used to exchange data using a different band than the first communication interface 104*a*.

In certain embodiments, the first communication interface 104*a* may be configured to exchange data using a different band than the second communication interface 104*b* and/or the third communication interface 104*c*. In certain embodiments, each communication interface of the communication device 102 is configured to communicate using/corresponds to a different band than each of the other communication interfaces. The different bands may overlap with one or more of the bands that correspond to the other communication interfaces and/or may not overlap with one or more of the bands that correspond to the other communication interfaces. The communication device 102 may establish a link with one or more other devices using one or more communication interfaces of the communication device 102.

The communication interfaces (e.g., the first communication interface 104*a*, the second communication interface 104*b*, and/or the third communication interface 104*c*, etc.) may include an antenna. The antenna may be included within a housing of the communication device 102 and/or be external to the housing of the communication device 102.

Block diagram 100 further illustrates a first transmission area 106*a*, a second transmission area 106*b*, and a third transmission area 106*c*, collectively consider the halo of communication device 102. A transmission area may may refer to a geographic region within which a transmitted signal can be effectively received and interpreted by a receiving device. The size and shape of this area can depend on a transmission power, a frequency band used by a communication interface, environmental conditions, obstacles (e.g., buildings, people, terrain, tables, and/or cars, etc.), and/or atmospheric interference. As an example, low-frequency radio waves may travel long distances and penetrate obstacles, creating a broad transmission area, whereas higher-frequency signals may have a relatively smaller coverage area due to increased attenuation and limited penetration. As an additional example, Bluetooth can operate in a 2.4 GHz band for short-range communication, while cellular networks can use multiple bands (e.g., 700 MHz, 1800 MHz, 2600 MHz) to balance coverage and data speed. The choice of frequency band can affect factors like signal range (e.g., transmission area), penetration, and/or data rate or can be affected by factors such as desired signal range, penetration, and/or data rate.

The first transmission area 106*a* may be a transmission area the first communication interface 104*a* is capable of transmitting signals within, the second transmission area 106*b* may be a transmission area the second communication interface 104*b* is capable of transmitting signals within, and the third transmission area 106*c* may be a transmission area the third communication interface 104*c* is capable of transmitting signals within. The first transmission area 106*a*, second transmission area 106*b*, and third transmission area 106*c* may include a transmission area that one or more bands are capable of transmitting signals within. Block diagram 100 shows the third transmission area 106*c* being larger than the second transmission area 106*b* and first transmission area 106*a* for the sake of explanation and is not meant to be limiting. Additionally, the third transmission area 106*c* may have a maximum transmission range (e.g., a radius for a circular transmission area) be millimeters, centimeters, meters, kilometers, etc. longer than the transmission range of the first transmission area 106*a*.

As described above, the transmission range can affect which devices the communication device 102 can transmit signals to (e.g., which devices may receive a signal from the communication device 102). The transmission ranges of other devices and the communication interfaces of the communication device 102 can affect which signals are received by the communication device 102. As an example, if the other device transmits a signal and the communication device 102 is outside the signal range of the other device, the communication device 102 will not be able to receive the signal and process the signal regardless of what communication interfaces the communication device 102 includes. In another example, if the other device transmits a signal and the communication device 102 is within the signal range of the other device, the communication device 102 may be capable of receiving the signal and processing the signal if the signal can be detected by an communication interface (e.g., supported band) of the communication device 102 and processed (e.g., supported communication method) by the communication device 102. Devices that the communication device 102 can exchange data with can be referred to as peer devices, which may be fungible peer devices.

In certain embodiments, the communication device 102 may have a form factor that is similar to a credit card. The communication device 102 may include one or more fastening mechanisms (e.g., a magnet, hook and loops, a clip, an adhesive, and/or a suction cup, etc.) that enables the communication device 102 to be fastened to an object or person. Certain embodiments described herein describe other criteria used to determine which communication interface is used by the communication device 102 for exchanging data and processing the communication device 102 may perform to receive, process, and/or transmit data. Halo devices having a credit card form factor may have external antennas through which they transmit wireless data. In such cases, the device may connect through a wired interface to the external antennas, possibly through, but not limited to, a USB or a USB-C connector. The credit card form factor of the device may be a work badge or a door badge, and the external antennas could be in the lanyard or charging cable where that cable can be used as a lanyard too, or other multipurpose attachments that can be used for additional functioning.

As described above, in certain embodiments, a communication interface of the communication device 102, such as the first communication interface 104*a* includes a light based communication interface. The light based communication interface may use lasers, infrared light, visible light, and/or ultraviolet light. A light based communication interface can be used to detect a line of sight. For example, the line of sight may be used to detect movement within a range of the communication device 102 and/or determine whether a peer device is within line of sight of the communication device 102. An example of laser communication interface may include modulated lasers communications via one or more thin-film lithium niobate (TFLN) described in U.S. Pat. No. 12,422,726 to Hung et. Al. titled "Method of Making Thin Film Lithium Niobate Electro-Optical Modulators," filed May 15, 2023, herein incorporated in its entirety for all purposes. Such approaches can be considered advantageous because a line of sight laser may carry a modulated signal (e.g., RF, etc.) without requiring licensing a corresponding RF band and because such lasers may having much greater range (e.g., about 400 km or more for space to ground, about 40,000 km or more for LEO-GEO and even deep space links, etc.).

Figure 2:
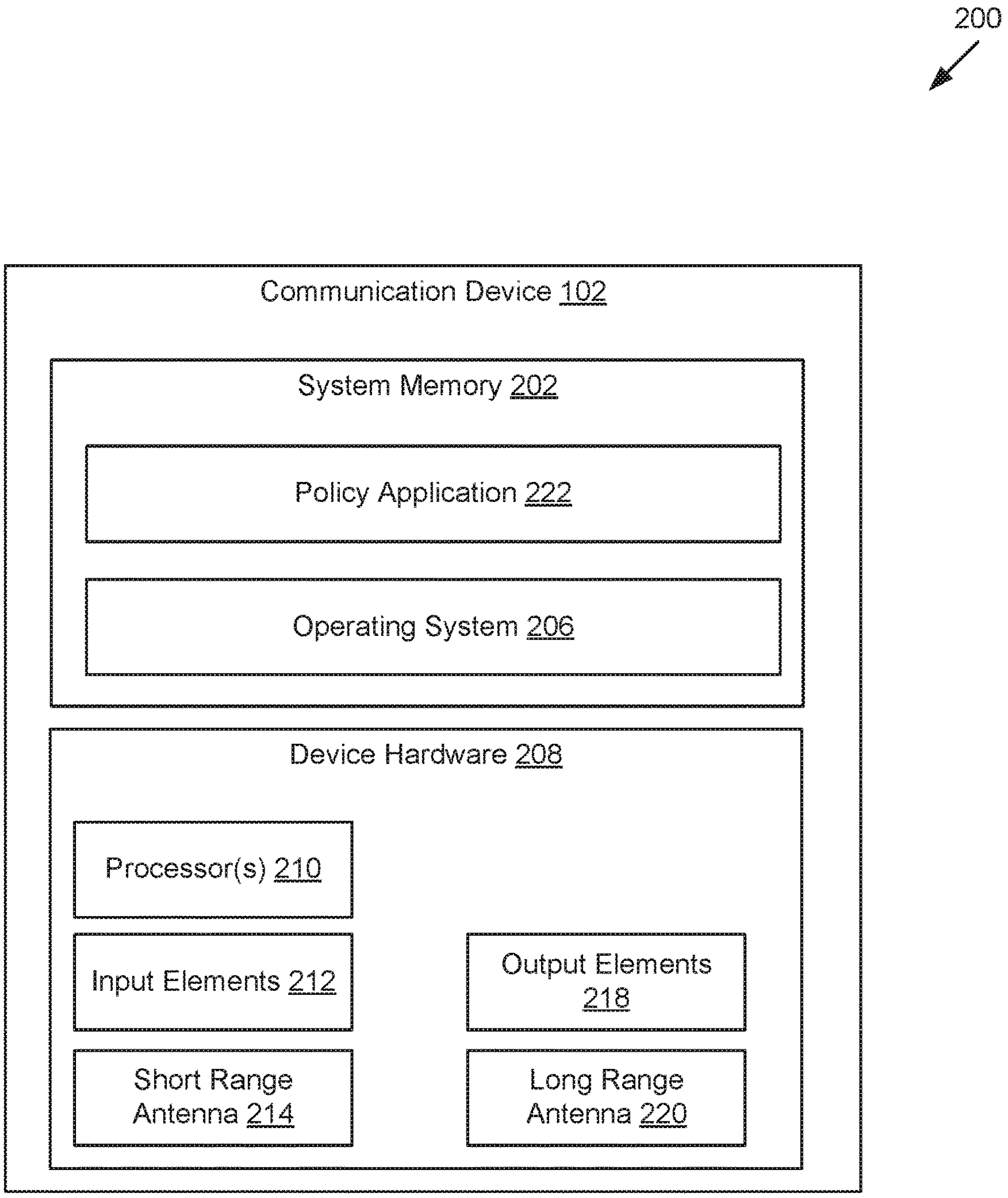
FIG. 2 illustrates a block diagram of a communication device according to certain embodiments, in accordance with the present disclosure.

FIG. 2 illustrates a block diagram 200 of a communication device 102 (e.g., communication device 102 described above with respect to FIG. 1) according to certain embodiments, in accordance with the present disclosure. The communication device 102 may include a system memory 202 and device hardware 208. The communication device 102 may include a housing that houses at least one component of the communication device 102. The communication device 102 may be capable of performing tasks described herein.

Device hardware 208 may include a processor 210, input elements 212, at least one short range antenna 214, a user interface 216, output elements 218, and/or at least one long range antenna 220. Input elements 212 and output elements 218 may be examples of communications interfaces (e.g., first communication interface 104*a*, second communication interface 104*b*, third communication interface 104*c* described above with respect to FIG. 1).

Input elements 212 may capture and transmit data from an environment (e.g., users, animals, and/or other communication devices) external to the communication device 102 for processing. Input elements 212 can provide input to the communication device 102 to use for processing and/or generating output (e.g., for output by output elements 218). Examples of input elements 212 includes a touchscreen, a sensor (e.g., a sensors for location, light, temperature, motion, acceleration, and/or direction, GPS unit or sensor, etc.), a camera, a microphone, a receiver, and/or a transceiver. In certain embodiments, one or more input elements 212 are configured to receive signals, and cannot or do not transmit signals because they are a unidirectional communication interface. For example, an input element may be a passive sensor and/or antenna that detects signals incident on the element, which may then be amplified. In certain embodiments, one or more input elements 212 are configured to also output elements 218 and can transmit signals in addition to being configured to receive signals because they are a bidirectional communication interface.

Output elements 218 may convey processed information from the communication device 102 to users (e.g., via a user interface) and/or other systems. Output elements 218 may present (e.g., visually, and/or audibly, etc.) and/or transmit results of processing performed by the communication device 102. Examples of output elements 218 include displays, speakers, light emitting diodes (LED), other light based interfaces, printers, haptic feedback systems, a transmitter, and/or a transceiver.

The processor 210 can be implemented as one or more integrated circuits (e.g., one or more single core or multicore microprocessors and/or microcontrollers), and can be used to control the operation of communication device 102. The processor 210 can execute a variety of programs in response to program code or computer-readable code stored in the computer-readable non-transitory system memory 202, and can maintain multiple concurrently executing programs or processes.

The long range antenna 220 may be an example of an input element 212 and/or an output element 218. The long range antenna 220 may include one or more radio frequency (RF) transceivers and/or connectors that can be used by communication device 102 to communicate with other devices and/or to connect with external networks through a long range communication medium (e.g., LoRa, laser, etc.). The input elements 212 and output elements 218 allow a user to interact with and invoke the functionalities of communication device 102. The short range antenna 214 may be configured to communicate with external devices through a short range communication medium (e.g., using Bluetooth, Wi-Fi, infrared, NFC, laser, etc.). The long range antenna 220 may be configured to communicate with a remote base station and/or a remote cellular or data network, over the air. A short range antenna 214 and a long range antenna 220 are depicted for explanatory purposes. The communication device 102 may include more or less antennas that are capable of transmitting and/or receiving data from a shorter ranger or a longer range and/or data transmitted using a lower frequency or a higher frequency.

The system memory 202 can be implemented using any combination of any number of non-volatile memories (e.g., flash memory) and volatile memories (e.g., DRAM, SRAM), or any other non-transitory storage medium, or a combination thereof media. The system memory 202 may store computer code, executable by the processor 210, for performing any of the functions described herein. For example, the system memory 202 may comprise a computer readable medium comprising code, executable by the processor 210, for implementing a method as described herein.

For example, the method may cause the communication device 102 to establish a connection with a peer device and exchange data with the peer device. The peer device may be a device that is a single networking hop away from the communication device 102. The peer device may be a device that the communication device 102 can exchange data with (e.g., within transmission range of the communication device 102).

The method may include instantiating a communication policy (e.g., a communication halo policy) in the system memory and that provides for coordination of the plurality of communication interfaces. The communication policy can be considered as set of conditions that may be required to service one or more missions or objectives. Each policy may be defined based on the operational attributes of the plurality of communication interfaces with respect to the mission objects. The communication policy may include a peer device handshake protocol. The peer device handshake protocol may define a process used by the communication device 102 to establish a connection (e.g., a unidirectional connection and/or a bidirectional connection) with a peer device or other devices. The handshake protocol may indicate a number of peer devices to establish a connection with and/or which communication interfaces of the communication device 102 should be used for establishing one or more connections. The peer device handshake protocol may cause both devices to be synchronized, agree on communication parameters, and verify each other's availability. The handshake protocol is described in further detail herein below.

The communication policy may include connection bandwidth criteria. The connection bandwidth criteria can define connection/communication bandwidth constraints that should be satisfied by a link established between the communication device 102 and a peer device. For example, the connection bandwidth criteria may indicate that a connection established by the communication device 102 to a peer device should support a minimum bandwidth (e.g., a minimum bandwidth of at least 1 GB/s, 1 MB/s, etc.). The connection bandwidth criteria is described in further detail herein.

The communication policy may include connection range criteria. The connection range criteria can define connection/communication range constraints that should be satisfied by a link established between the communication device 102 and a peer device. For example, the connection range criteria may indicate that the peer device is more or less than a defined distance away from the communication device 102. In certain embodiments, a further or longer range is preferred because less hops may be performed, possibly even in circumstances where bandwidth is low. In certain embodiments, a shorter range is preferred because bandwidth may be higher as a result, less power may be used, and/or less peer devices may satisfy the range and therefore handshakes with peer devices can be reduced. In a situation, a short range may be desirable to triangulate a single device's location based on the range of the signal helping to locate the device, a vehicle, and/or a person, based on the location of the devices that can be reached and the range of the signal used. The connection range criteria is described in further detail herein.

The communication policy may include transmission constraints. The transmission constraints may define constraints to use when exchanging data to and/or from the communication device 102. The transmission constraints may include a communication protocol to use (e.g., BTLE, LoRA, etc.), latency constraints, energy constraints, time periods between performing transmissions, and/or a communication device 102 sleep schedule, etc. The transmission constraints are described in further detail herein.

The criteria for selecting transmissions techniques may be based on environmental conditions such as weather, properties of the surrounding area, elevation, mission objectives, and/or location restrictions. The weather could range from heavy rain, thunderstorms, magnetic interference from solar flares, heavy snow, fog, etc., some of these conditions may affect some transmission types more than others and even may sum nonfunctional. Locations and objects (e.g., subways, mountains, underwater, caves, metal enclosures, ships, a warehouse, a factory, etc.) can present their own challenges for some types of mediums more than others. Selecting a transmission technique may be based on surrounding area. For example, some areas ban a specific frequency, frequencies, etc. such as hospitals, radio telescopes, military installations etc. The selection for the type of communication may take into account the environmental condition and restrictions to select a use for the condition and/or restrictions. Thus, the communication policies may encode such restrictions, possibly based on the operational attributes and/or their corresponding values of the communication interfaces.

The method may include establishing one or more connections with at least one peer device via the plurality of communication interfaces based on the peer device handshake protocol, satisfying the bandwidth connection criteria, and/or satisfying the range connection criteria. The method may further include exchanging at least one data packet over the connection via the plurality of communication interfaces according to the transmission constraints.

The system memory 202 may also store the policy application 222 and the operating system 206. The policy application 222 may store the communication policy of the communication device 102. The communication policy may define connection bandwidth criteria, connection range criteria, transmission criteria, The device hardware 208 may include a power source. The power source may include an internal and/or external battery. The power source may include a solar panel. The battery may be charged by a solar panel. Thus, the power source may be included in device housing or be external to the device housing.

Figure 3:
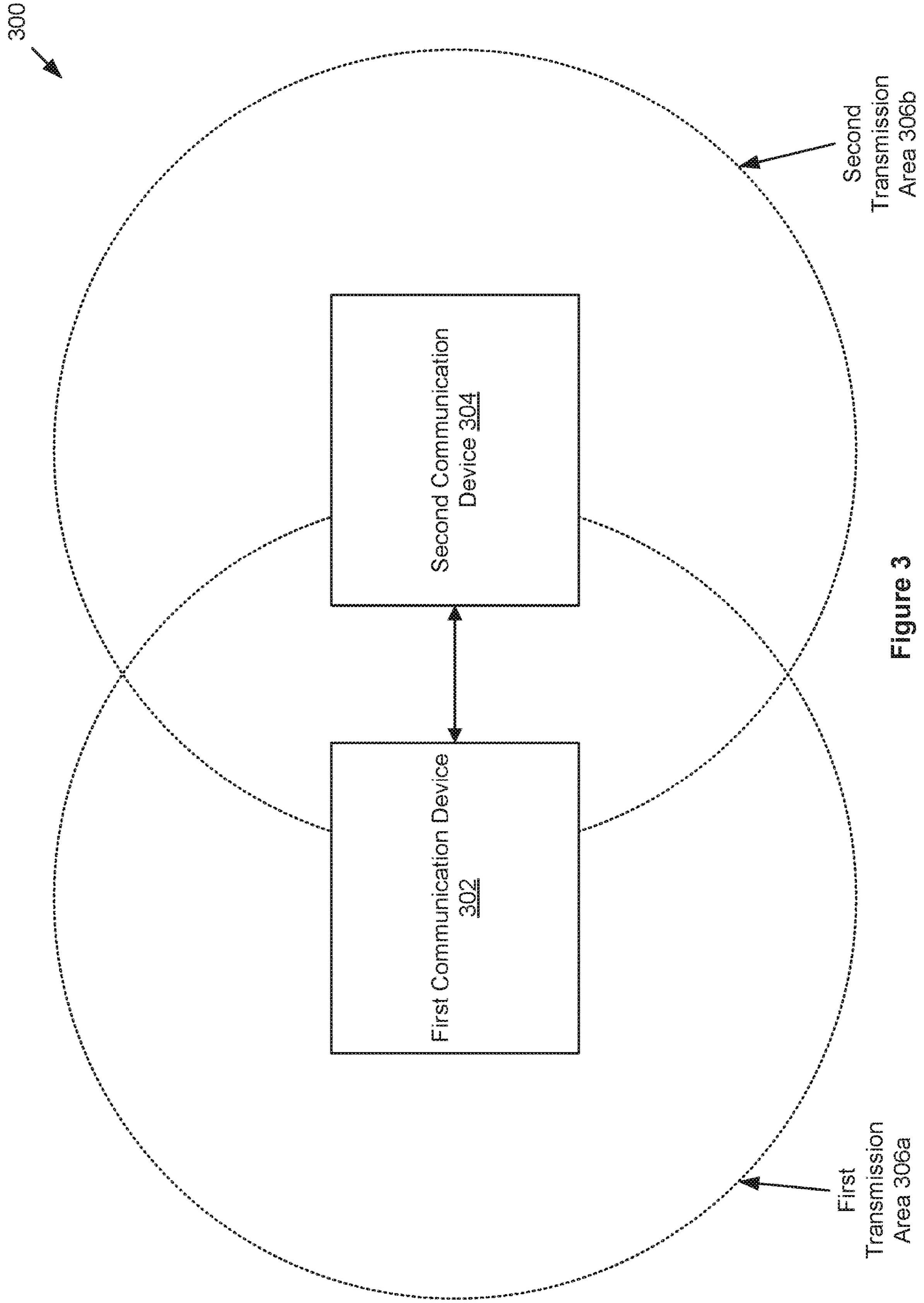
FIG. 3 illustrates a block diagram of a system according to certain embodiments, in accordance with the present disclosure.

FIG. 3 illustrates a block diagram 300 of a system according to certain embodiments, in accordance with the present disclosure. The block diagram includes a first communication device 302 and a second communication device 304, although any practical number of communication devices may be included. The first communication device 302 and/or the second communication device may include a communication device like the communication device 102 described above with respect to FIG. 1.

The first communication device 302 may include at a first communication interface that enables the first communication device 302 to transmit a first signal within the bounds of the first transmission area 306*a* or halo. The first transmission area 306*a* may be determined based on factors such as which band is used by the first communication interface, how much power is used by the first communication interface, the environment the first communication device 302 is located in, and/or other operational attributes as described above and as defined in the corresponding communication policy. The first transmission area 306*a* can enable devices within the first transmission area 306*a* to receive the first signal. The first communication interface may enable the first communication device 302 to receive a second signal from a second communication interface of the second communication device 304 when the first communication device 302 is within a second transmission area 306*b* (e.g., halo, etc.) of the second communication device. The second communication interface of the second communication device may enable the second communication device to transmit the second signal within the bounds of the second transmission area 306*b*. The second transmission area 306*b* may be determined based on factors such as which band is used by the second communication interface, how much power is used by the second communication interface, the environment the second communication device is located in, and/or other factors as described above. The second communication interface may enable the second communication device 304 to transmit signals from the second communication interface. One should appreciate that communication device 302 and communication device 304 may communication unidirectionally or bidirectionally when the devices are within corresponding halos of each other represented by transmission areas 306*a* and 306*b*.

The first communication device 302 may have established a connection (e.g., via a communication interface link) with the second communication device 304. The second communication device may be a peer device to, possibly fungible with, the first communication device 302 because the second communication device 304 is a single hop away from the first communication device 302. The second communication device may receive data from the first communication device 302 before processing at least a portion of the received data. The second communication device may receive the data from the first communication device 302 before storing at least a portion of the received data and/or storing at least a portion of the processed data. The second communication device may transmit at least the portion of the processed data and/or at least the portion of the received data to a peer device of the second communication device (e.g., the first communication device 302 and/or another device).

The first communication device 302 may have established the connection with the second communication device after the second communication device was moved within the first transmission area 306*a*.

For simplicity of explanation, the first communication interface and the second communication interface are described as being bidirectional communication interfaces being used to establish at least a single communication link between the first communication device 302 and the second communication device, however, in certain embodiments as described herein, one or both of the communication interfaces may be unidirectional. Additionally, as described herein, the multiple communication interfaces may be used by each the communication device and the second communication device to transmit and/or receive signals within one or more bands or laser frequency thereby enabling the first communication device 302 and the second communication device to exchange data using multiple links.

In certain embodiments, the first communication device 302 transmits signals to the second communication device regardless of whether the first communication range is within the second transmission area 306*b* of the second communication device. The second communication device may receive the signals from the first communication device 302 and perform further processing based on the signals. The processing may include using and/or storing at least a portion of the data received from the first communication device 302. The second communication device may transmit at least a portion of the data received from the first communication device 302 and/or the processed data to one or more other devices that are peer devices of the second communication device.

Figure 4:
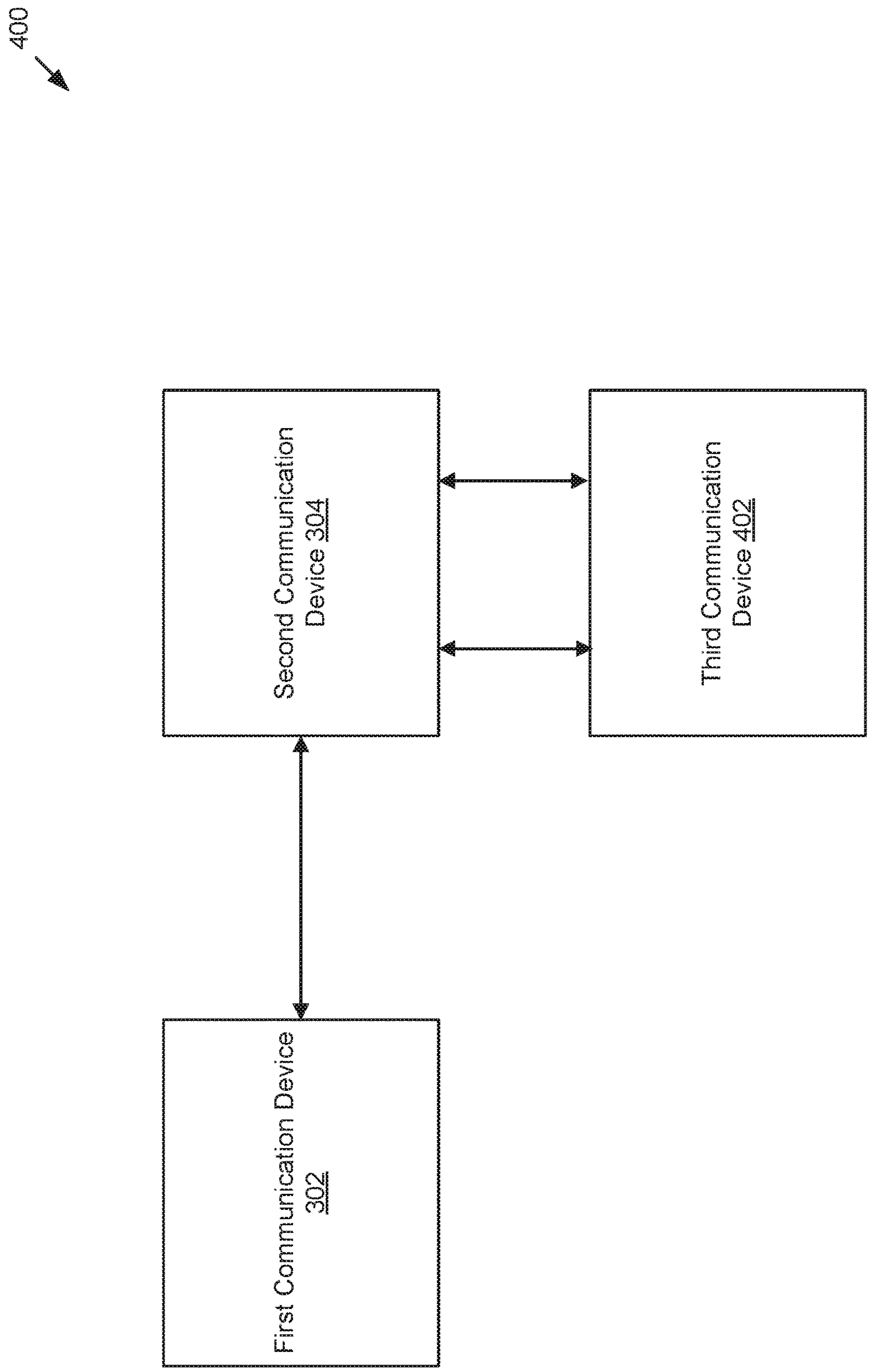
FIG. 4 illustrates a block diagram of a system according to certain embodiments, in accordance with the present disclosure.

FIG. 4 illustrates a block diagram 400 of a system according to certain embodiments, in accordance with the present disclosure. Block diagram includes a first communication device 302 (e.g., first communication device 302 described above), a second communication device 304 (e.g., second communication device 304 described above), and a third communication device 402 302. The third communication device 402 may be the communication device 102 described above. While FIG. 4 illustrates three communication devices, any practical number of communication devices may be included in the system.

In certain embodiments, the communication device(s) can be part of a mesh network (e.g., MANET protocols, OLSR, AODV, BATMAN, Meshmerize, MAVlink, etc.). A mesh network may distribute connectivity across multiple nodes (e.g., communication devices, peer devices, etc.) which can improve reliability, coverage, and/or fault tolerance. For example, if one node fails or experiences interference, the mesh network may automatically reroute data through alternative links and or hop paths. The block diagram 400 may illustrate the system at a point in time before or after a point in time that corresponds to block diagram 300. For example, the third communication device 402 may have been brought within communication range of the second communication device and joined a mesh network that included the first communication device 302 and the second communication device. In certain embodiments, if the third communication device 402 is brought outside of range of one or more other devices (e.g., the second communication device), the third communication device 402 may store data (e.g., data collected by sensors coupled to the third communication device 402) until the third communication device 402 can establish a connection with one or more devices (e.g., communication devices).

The block diagram 400 illustrates that more than one communication link can be established between devices (e.g., communication devices). For example, the third communication device 402 may have established two or more links with the second communication device 304. A first link may be established using a first communication interface of the third communication device 402 and a second link may be established using a second communication interface of the second communication device. Additionally, the first link may be established using a third communication link of the third communication device 402 and a fourth communication link of the second communication device.

The first link may have different properties than the second link. For example, the first link and the second link may support different bandwidths, maximum ranges, energy usage, protocols (e.g., LoRa, Wi-Fi), and/or communication bands. The two links may have been established to communicate data relating to different applications and/or security sensitivities (e.g., confidentiality, integrity, and/or availability of transmitted data). The two links may have been established to increase the overall bandwidth between the second communication device and the third communication device 402. In certain embodiments, one or more of the first link and the second link may include a unidirectional communication channel between the second communication device and the third communication device 402. Thus, a single communication channel between devices might comprise multiple links sending or receiving data at the same time. For example, first communication device 302 might have a single channel with multiple links via different interfaces with third communication device 402 using second communication device 304 as a intermediary device. A high bandwidth link may be used for bulk data communication, say from sensing a platform device (e.g., first communication device 302) and a low bandwidth link may be used via a low bandwidth channel from a management or a control device (e.g., third communication device 402), which may send command and control instructions to first communication device 302. In such cases, the single channel may be configured via a single communication policy distributed among communication devices 302, 304, and 402.

The block diagram 400 illustrates that the first communication device 302 may have established a direct link and direct connection with the second communication device while the first communication device 302 also establishes an indirect link and indirect connection with the third communication device 402 because the second communication device acts as an intermediary between the first communication device 302 and the third communication device 402. An indirect connection between two communication devices may be a connection where the two communication devices are not directly connected and instead rely one or more intermediary communication devices for the communication between the two devices.

In certain embodiments, multiple links are established between the second communication device and the third communication device 402 because the multiple links may enable an aggregation of bandwidths to increase data exchange between the second communication device and the third communication device 402. In certain embodiments, the multiple links are established so certain data can be transmitted using a link that uses less energy than another link between the second communication device and the third communication device 402 when transmissions constraint allow. In certain embodiments, the second device may use the second link to transmit data to the third device because the second link does not have a connection range as high as the first link. The lower connection range (e.g., 10 meters instead of 100 meters) can result in security improvements because data may not be transmitted over as large of an area where it could be sniffed.

In certain embodiments, the link between the first communication device 302 may use a different communications protocol than one or more of the links between the second communication device and the third communication device 402. The second communication device may be configured to process data received from the first communication device 302 and translate the data into a form that can be used by the communication protocol(s) used to transmit data from the second communication device to the third communication device 402.

The second communication device may be configured to buffer/store at least a portion of the data received from the first communication device 302 before sending the data to the third communication device 402. For example, buffering the data in the system memory may be useful because the total bandwidth for the second communication device to send data to the third communication device 402 may be lower than the total bandwidth for the second communication device to receive the data from the first communication device 302.

Figure 5:
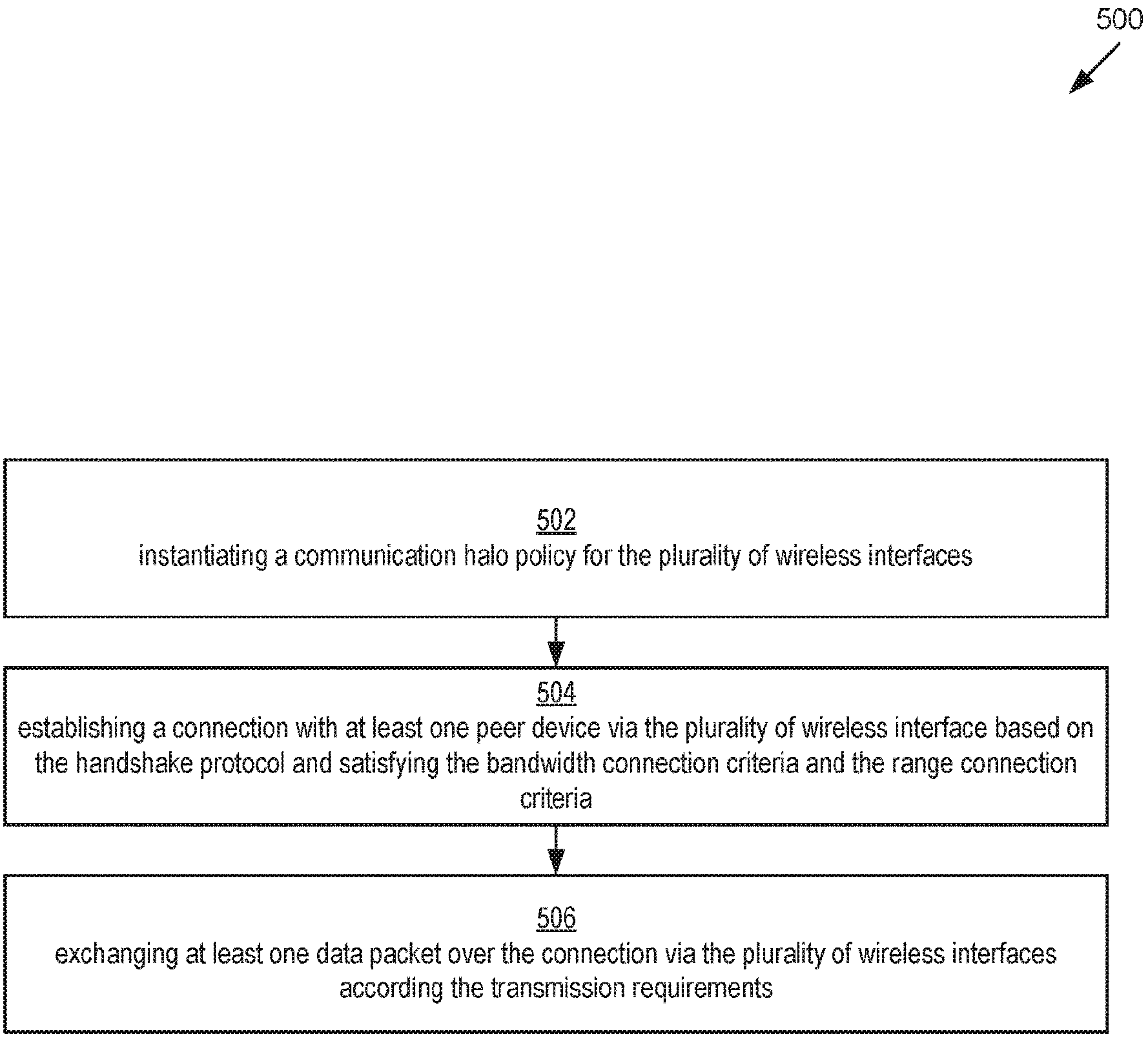
FIG. 5 shows a flow diagram illustrating a method performed by a communication device according to certain embodiments, in accordance with the present disclosure.

The processing depicted in flow diagram 500 of FIG. 5, and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in flow diagram 500, and other FIGS. and described herein are intended to be illustrative and non-limiting. Although flow diagram 500, and other FIGS. depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in flow diagram 500, and other FIGS, may include a greater number or a lesser number of steps than those depicted in the respective FIGS.

FIG. 5 shows a flow diagram 500 illustrating a method performed by a communication device (e.g., communication device 102 described above) according to certain embodiments, in accordance with the present disclosure. The method may be performed by the communication device to establish a connection with a peer device using one or more communication interfaces (e.g., first communication interface 104*a*, second communication interface 104*b*, third communication interface 104*c*) of the communication device.

At step S502, a communication policy may be established (e.g., established in memory of the wireless device) by instantiating the policy within the system memory, possibly as a distinct, manageable object. The communication policy may provide for programmatic control of the communication interfaces of the communication device. The communication policy may include a rule set for using the communication interfaces and that operation based on the operational attributes of the communication interfaces. The rule set may include predefined guidelines and protocols that can dictate how the device establishes, maintains, and terminates connections with other devices (e.g., peer devices). The rules can affect efficient, secure, and/or reliable data exchange by defining transmission constraints frequency/band criteria, transmission power criteria, bandwidth criteria, modulation techniques criteria, error handling criteria, transmission protocol criteria, encryption criteria, data format criteria, and/or connection range criteria, etc. to satisfy when establishing and/or using a connection with another device.

The communication policy may be defined based on an application running on the wireless device, hardware that the wireless device includes, a location of the wireless device, and/or a time of day, etc. Thus, there may be more than on communication policy, possibly one for each application or deployment context in which the device finds itself. For example, a device used for communication in a wilderness setting (e.g., hiking, forestry, etc.) may have a policy defined that leverages short range wireless channels to communication personal status to members of a hiking group and leverages long range wireless channels to emergency personal 10's of kilometers away.

The communication policy may include a communication halo policy. The communication policy halo policy may indicate that communications by the communication device should be bidirectional. As an example, the bidirectionality may include using a single communication interface to establish a single link with a peer device, where the single communication interface is configured to perform bidirectional communication with a peer device. As another example, the bidirectionality may include using two communication interfaces to establish two links with a peer device, where one of the two communication interfaces is configured to receive incoming data from the peer device and the other of the two communication interfaces is configured to transmit outgoing data to the peer device.

The communication policy may include a communication aura policy. The communication aura policy may indicate that communications by the communication device should be unidirectional. As an example, the aura policy may indicate that one or more communication interfaces of the communication device should be used for receiving data from one or more peer devices or that the one or more communication interfaces should be used for transmitting data to one more peer devices. In certain embodiments, the aura policy may indicate that if one communication interface of the wireless device is configured to receive data from a peer device, then no other communication interfaces will be configured to transmit data to any peer device. On the other hand, the aura policy may indicate that if one communication interface of the wireless device is configured to transmit data to a peer device, then no other communication interfaces will be configured to receive data from any peer device The communication policy may include a peer device handshake protocol. The peer device handshake protocol may include a protocol for performing a handshake between the wireless device (e.g., a communication device) and a peer device (e.g., a communication device). The peer device handshake protocol may define a process and/or criteria for establishing a connection with a peer device before payload data is exchanged with the peer device. This peer device handshake protocol can ensure the communication device and the peer device are synchronized, agree on communication parameters, and/or verify each other's identity to create a stable and secure link. The peer device handshake protocol can involve an exchange of signals or messages to negotiate aspects such as frequency, encryption, error-checking methods, and transmission speed.

For example, in some embodiments, each device may be provisioned with communication policies and/or corresponding missions or objectives. A first device may connect with a second device via an a priori defined base link or management channel. The first device may send its required policies and/or missions, possibly using a policy and/or identifier (e.g., GUID, UUID, policy number, hash value, etc.). If the second device also has the corresponding policy or can help with the mission. In response, the second device may acknowledge (ACK) that is capable of participating with the first device because it has the corresponding policies and can operate accordingly. Alternatively, the second device any respond indicating it cannot participate or may respond with one or more alternative policies with which it may participate. Such approaches may be advantageous in embodiments where each device may have a different roles. Some devices may be only able to operate as a sensing node (e.g., a data source node), while other might be able to operate as a routing node (e.g., mesh node), and yet others might be able to operate as a network edge device operating as an access point to backhaul networks (e.g., WLANs, the Internet, etc.). Further, if the second device is unable to fulfill the first device's request, the second device may forward the request to a neighboring device.

The peer device handshake protocol can cause peer device properties to be received from the peer device. The peer device properties may include an indication of available bandwidth of the peer device (e.g., bandwidth for receiving data, bandwidth for transmitting data, bandwidth for computations by the peer device), an available data rate of the peer device (e.g., incoming data rate, outgoing data rate, processing data rate), an available range the peer device can transmit within (e.g., 1 meter, 10 meters, 1 km, 10 km, 1000 km, etc.), available bands the peer device can use, protocols supported by the peer device, a routing table maintained by the peer device, and/or provisionable services of the peer device. Provisionable services of the peer device may indicate what the peer device can provide. For example, what applications that peer device can run, hardware used by the peer device, which devices the peer device can communicate with (directly and/or indirectly) and/or has a connection established with.

The peer device handshake protocol may be used by one or more of the communication interfaces of the communication device. In certain embodiments, the peer device handshake protocol may indicate that a certain number or a minimum number of communication links is to be established with the peer device if a connection is to be established. For example, the peer device handshake protocol may indicate that if a connection is to be established between the communication device and the peer device, two links must be established between the communication device and the peer device. The two links may use two communication interfaces of the communication device and the peer device.

In certain embodiments, the peer device handshake protocol may include a discovery protocol that can indicate which communication interfaces should be used and/or should not be used. Indicating which communication interfaces should or should not be used can improve security of the communication device. For example, the peer device handshake protocol may indicate that a first communication interface that operates using a first band should be used by the communication device to establish connections and that a second communication interface should not be. The first communication interface may be configured to perform communication within a meter of the communication device and the second communication interface may be capable of performing communication within 1,000 meters (or further) of the communication device. Since the second communication interface may not be used (e.g., may be disabled, may not transmit signals), the communication device may remain unknown to other peer devices that are not within the communication range of the first communication interface.

In certain embodiments, the discovery protocol indicates an order for using the communication interfaces of the communication device. For example, the discovery protocol may indicate that a first communication interface of the communication device should be used to try to discover a peer device and/or perform a handshake with the peer device before a second communication interface is used. For example, the first communication interface may be better suited for communicating using low power than a second communication interface. Therefore, the discovery protocol may prioritize trying to use the first communication interface before trying to use the second communication interface to perform a handshake and/or establish a connection.

In certain embodiments, the peer device handshake protocol includes a beacon protocol (which may also be referred to as a heartbeat protocol). The beacon protocol may may define a process and/or criteria for transmitting pulses (which may also be referred to as heartbeats). A pulse may be transmitted by one or more communication interfaces of the communication device periodically. The pulses may indicate the presence of the communication device to peer devices within communication range of the one or more communication interfaces of the communication device. In certain embodiments, the pulses may indicate more than presence. For example, the pulses may include data representing, in a search and rescue scenario, that someone is alive, that someone is hurt, help is requested, a location, a speed, an oxygen level, and/or a depth. In certain embodiments, the pulses may include an indication of peer devices that the communication device has received a pulse from and/or established a connection with. In certain embodiments, a subset of the communication interfaces of the communication device may be used to perform pulses. Such pings or pulses may then propagate from communication device to communication device through a mesh of communication devices toward to a destination communication device.

In an example, the beacon protocol may indicate that pulses should be transmitted using a first band instead of a second to reduce how far the pulse could be detected from the communication device. Reducing how far the pulse can be detected may be useful in certain cases because many communication devices may be included in an area and power consumption and signal interference may be reduced by decreasing the range of each communication device (e.g., the communication devices may form a mesh network and therefore the data may still be transmitted over a long distance via the mesh network even if transmitted over a short distance by each communication device in the mesh network). The pulses may be used to begin a handshake with a peer device and/or to exchange data over a communication link after the handshake has been performed. In certain embodiments, the beacon protocol defines a data rate to use for exchanging data over a connection (e.g., a low-bandwidth data rate less than 1000 bps).

The communication policy may include connection bandwidth criteria. The connection bandwidth criteria may include criteria for establishing a connection with a peer device. The connection bandwidth criteria may indicate bandwidth criteria that applies to the communication device and/or the peer device. As an example of bandwidth criteria that applies to the communication device, the connection bandwidth criteria may indicate bandwidth criteria for establishing a connection with a peer device such as that the connection (e.g., an aggregated bandwidth using one or more links, etc.) should have a bandwidth above a predefined threshold. As an example of bandwidth criteria that applies to the peer device, the connection bandwidth criteria may indicate that the peer device should have a processing bandwidth, an outgoing bandwidth, and/or an incoming bandwidth of at least a predefined amount. The connection bandwidth criteria may be useful to the communication device to ensure the peer device meets minimum bandwidth requirements and that the peer device will be able to support the load that the communication device may put the peer device under. At least a portion of the connection bandwidth criteria the communication device operates according to may have been provisioned/set by another peer device (e.g., a policy provisioning system), an application, and/or based on input from a user interface, possibly leveraging OpenNMS (see URL opennms.com) an open source network monitoring utility. OpenNMS provides a scalable network management platform with network traffic analytics, network discovery, alerting, monitoring, dashboard, and other network management capabilities.

The communication policy may include connection range criteria. The connection range criteria may include criteria for establishing a connection with a peer device. The connection range criteria may indicate range criteria that applies to the communication device and/or the peer device. As an example of a range that applies to the communication device, the connection range criteria may indicate that a communication interface of the communication device should be used that will support a connection range of 100 meters. As an example of a range that applies to the peer device, the connection range criteria may indicate that the peer device should include a communication interface capable of transmitting data up to 100 meters. At least a portion of the connection range criteria the communication device operates according to may have been provisioned/set by another peer device (e.g., a policy provisioning system), an application, and/or based on input from a user interface.

In certain embodiments, the connection range criteria includes range criteria that indicated a connection range of 1 meter, 10 meters, 100 meters, 1,000 meters, and/or 10,000 meters be supported by one or more links of the communication device and/or a peer device of the communication device. The connection range criteria may include range criteria indicating a short range (e.g., less than 1,000 meters) to assist with establishing a tight mesh network. The connection range criteria may include range criteria indicating a long range (e.g., more than 1,000 meters) to assist with establishing a loose mesh network. In embodiments where the communication devices include a heterogeneous mix of devices with differing capabilities, the range criteria may be different for different types of devices. For example, the policy may include long range criteria for a broad ranging mesh network of drones and may also include short range criteria for drones that focus on local sensing and only communicate with the closes node in the mesh.

In certain embodiments, the communication policy may include location criteria. The location criteria may include criteria for establishing a connection with a peer device. The location criteria may indicate location criteria that applies to the communication device and/or the peer device. As an example of location criteria that applies to the communication device, the location criteria may indicate that the communication device be at a defined location before the communication device exchanges data over one or more links. As an example of location criteria that applies to the peer device, the location criteria may indicate that data may not be exchanged over one or more links with the peer device unless the peer device is at a defined location. At least a portion of the location criteria the communication device operates according to may have been provisioned/set by another peer device (e.g., a policy provisioning system, OpenNMS minion, etc.), an application, and/or based on input from a user interface. The location may be indicated by a coordinate, and/or an S2 cell, etc. The location may include a geolocation, a zip code, and/or an area, etc.

In certain embodiments, the communication policy may include transmission constraints. The transmission constraints may define constraints to use when exchanging data to and/or from the communication device. The transmission constraints may include a communication protocol to use (e.g., BTLE, LoRA, etc.), latency constraints, energy constraints, time periods between performing transmissions, and/or a communication device sleep schedule, etc. Transmission constraints may indicate how to prioritize data being transmitted by the communication device. For example, the transmission constraints may indicate that during high traffic times, certain data should be prioritized (e.g., based on packet information such as sender, recipient, protocol, payload, etc.).

In certain embodiments, the communication policy is a session based communication policy. The session based communication policy may apply to particular sessions and/or may have been provisioned for particular sessions. For example, the session based communication policy may define communication constraints based on the peer device handshake and/or an application causing a connection to be established by the communication device.

In certain embodiments, the communication policy may include a mesh network policy (e.g., a halo mesh network policy). The mesh network policy may include constraints for a mesh network the communication device can be a part of. For example, a routing table, a maximum number of nodes, a maximum number of nodes per an area, minimum distance range between nodes, maximum distance range between nodes, communication interfaces to use, bands to use, etc.

In certain embodiments, the communication policy may include a whisker policy. The whisker policy may include constraints and processes for sensing other devices that the communication device is within range of. The whisker policy may include constrains relating to how often a sensing process for trying to sense peer devices occurs, whether responses can be sent in response to handshake signals received from peer devices, and/or which communication interfaces may be used to perform sensing, etc. The whisker policy can be considered to leverage passive sensors or passive receivers that only receive signals, possibly without providing signals to peer devices.

At step S504, the communication device may establish a connection with at least one peer device. The connection may be established using at least one of the communication interfaces of the communication device. Each communication interface of communication device used to establish a connection with a peer device may form a link with the respective peer device. A link may be established with one or more peer devices. More than one link may be established with a peer device. The connection may be established based on the communication protocol (e.g., the peer device handshake protocol, satisfying the bandwidth connection criteria, and satisfying the range connection criteria. The connection may be a session-based connection.

At step S506, the communication device may exchange data (e.g., at least one data packet) over the connection. The data may be exchanged using the connection(s) established by the communication device using one or more of the communication interfaces of the communication device. The exchanging of the data may be performed according to the transmission constraints included in the communication policy.

The methods and systems described in the present disclosure support multiple use cases. Below are some further illustrative non-limiting use cases.

In one use case, the communication device described above may be a backhaul uplink node or communication with a backhaul uplink node. Example backhaul technologies that may be adapted for use with the inventive subject are described in U.S. Pat. No. 7,599,314 to Wittenschlaeger and titled "Surface-Space Managed Fabrics" filed Oct. 13, 2008, incorporated in its entirety for all purposes. The backhaul uplink node may include a node that can transmit data from the backhaul uplink node to a higher-level network infrastructure such as a cell tower, a router, the internet, etc. The backhaul uplink node may serve as an intermediary that carries aggregated traffic from multiple communication devices to a broader network. A The backhaul uplink node may be used in a remote environment such that the backhaul uplink node is connected to the internet (e.g., via a long distance communication interface). Other communication devices that are not connected to the internet may use the backhaul uplink node to exchange data with the internet (e.g., or another network). For example, remote equipment may collect and/or generate data from remote farming activities, logging activities, fishing activities, etc. The remote equipment may be part of a communication device or may be communicative couples to the communication device. When the communication established a connection with the backhaul uplink node, the communication may transmit the collected and/or generated to the backhaul uplink node. In other embodiments, the remote equipment may share the collected and/or generated data with more than one communication device (e.g., sharing via another communication device) so that when one of the communication devices comes within communication range of the backhaul uplink node and establishes a connection with the backhaul uplink node, the collected and/or generated data from one or more communication devices may be transmitted to the backhaul uplink node.

The backhaul uplink node may also add as a local communication device network access point where data from outside of the local communication device network can be funneled into the local communication device network. The data may be funneled into the network to update communication policies, update software, and/or give instructions to a communication device included in the local communication device network.

In a use case, multiple communication devices may be placed along a path (e.g., a hiking path). The communication devices may exchange data with a device that passes by the communication devices (e.g., a phone of a hiker). The phone may not have a cellular connection and therefore friends of the hiker may not be able to locate the hiker if they become concerned and the hiker may not be able to call for help. The communication devices can detect the phone of the hiker and may log when the hiker passed by, how fast the hiker was moving, a direction the hiker was moving, etc. The communication devices may form a mesh network that may or may not be connected to the internet. The mesh network can be queried to determine activities of the hiker and/or the mesh network may report the activities of the hiker to the internet. Similar tracking could be performed by communication devices placed along a path traveled by boats, cars, etc. Peer devices of the boats, cars, or occupants in the boats or cars may transmit signals that the communication devices along the path may track and use to generate and maintain logs.

In a use case, a communication device is communicatively coupled with a drone. The communication device may be used to control the drone. The communication device may be in communication with one or more other communication devices that may have a direct or indirect connection to a controller of the drone. As a result, the drone can be controlled via the network of communication devices even when the drone would otherwise be out of range of the controller if the controller was used to directly communicate with the drone.

In a use case, communication devices may be located in a disaster area (e.g., an area where people and/or animals are being searched for after a building has fallen). The communication devices may sense signals transmitted from peer devices such as phones, tracking tags, etc. and be configured to determine how far the peer devices are from the communication device to help narrow a search area. Multiple communication devices may be places in an area to triangulate a signal of a peer device such as a user's phone so that the phone and/or the user of the phone can be found in a pile of rubble (e.g., or in an avalanche area or a war area).

The communication devices may be configured to form a mesh network so that local and/or wide area network connectivity and be restored in an area. Communication devices may be fastened to objects in an area, may be carried by people (e.g., search and rescue members, hikers, firefighters, military personnel, etc.), or dropped into an area to establish a mesh network, possibly creating a breadcrumb network. The mesh network can be used to assist with disaster recovery efforts. In certain cases, the communication devices can be solar powered and can enable a network to be established when power is out.

In a use case, communication devices include location sensors and are distributed throughout an area. The communication devices can determine the location of each device and enable a determination to be made as to which parts of the area are or are not covered by the communication areas of the devices. Such embodiments may be useful to determine connection dead zones areas of a mesh network. Thus, communication via short range (e.g., among mesh halo devices, etc.) and via long range (e.g., from a mesh edge device to an uplink or downlink) may be facilitated.

In some use cases, a set of communication devices may be places in a mineshaft, shopping mall, or amusement park, to establish a mesh network of communication devices. The communication devices may be used to sense how many peer devices, such as user phones, are nearby so a determination as to who and/or how many people are located in certain areas. Knowing where people are in a mall can inform where more cleaning or security may be needed and action can be taken in response. Knowing where people are in an amusement park may inform where dynamic pricing should go into effect, where more food should be prepared, where more amenities are needed, and action can be taken in response.

In a use case, a communication device may be places on a shipping container and/or package and when the communication device exchanges data with other communication devices, movement of the container or package may be tracked which can cause supply chain data to be generated, stored, and or transmitted.

In a use case, the communication device may be under a heavy data load with either a relatively large amount of incoming or outgoing traffic, the communication device may prioritize network traffic based on where the traffic originated from and/or the recipient of the traffic. The communication may buffer and/or drop packets based on the prioritization. Buffered packets may be sent when more resources are available and/or for a later time when it is likely that more resource may be available.

The following discussion includes additional considerations and details based on the above disclosure regarding wireless halo devices. As can be appreciated, the disclosed wireless halo devices can be considered a platform from which many application-specific use cases or general purpose use cases can be constructed as discussed further below.

One should appreciate, as alluded to above, that each wireless interface has a corresponding set of operational attributes that describe the nature of the corresponding wireless interface. Each operational attribute may have a corresponding value indicating the actual operating parameter for the attribute. For example, a wireless interface may have an operational attribute called "RANGE" with a value of "[0, 1000]" indicating a range of 0 to 1000 meters. Each value could have a different unit of measure and may be defined as part of a halo policy standard definition. Further, this example shows that an attribute's corresponding value may be multi-valued. Additionally, the operational attributes and values may correspond to an a priori defined halo device attribute namespace to ensure that all halo devices are able to communicate capabilities with each other and be understood by each other. Thus, a wireless interface definition based on such a namespace, including operational attributes and values, may be stored as a data object in the device's memory. The halo device wireless interface objects can be instantiated according to the halo policies, transferred from one device to another, or otherwise managed according to the halo policies.

Operational attributes may cover a wide range of information relating to a wireless interface. Some operational attributes include specific data regarding how a wireless interface directly operates possibly including functional attributes such as range, bandwidth, latency, frequency band, wavelengths, line-of-sight, power costs, device address (e.g., MAC address, etc.), and/or other direct attributes. Still, other operational attributes may include meta (e.g., non-functional, etc.) attributes that provide additional information about the wireless interface. Example meta attributes may include manufacturer, version number, time in field, mean-time between failure, mean-time to repair, indicator if field replaceable, end of life time or indicator, interface type (e.g., RF, laser, IrDA, etc.), indicators of radiation hardened, serial number, lot/batch number, certification or compliance information (e.g., EAR, ITAR, FCC, etc.), operating temperatures, shock ratings, altitude limits, security features (e.g., FIPS, encryption, etc.), or other metadata relating to the wireless interface. As mentioned previously, the values for operational attributes may be single valued or multi-valued. Still further, the values for the operational values may include tags. A tag may be an identifier or text indicating a type, say a type of interface: TYPE: RF, TYPE: LASER, TYPE: IR, etc. In other cases, the values may be Boolean values indicating if the corresponding attribute is available: LOS: TRUE, HARDENED: FALSE, etc. As stated previously the attribute names and values may be defined as part of an operational attribute namespace standard.

From a halo policy perspective, a halo policy represents the necessary, required, or optional wireless interface features to fulfill a mission or objective when the halo devices are deployed. Each mission or objective (e.g., search and rescue, provisioning backhaul networks, drone fleet management, surveillance, scouting, etc.) may require different operational attributes to achieve the desired goals. Thus, the mission or objective can be defined according to the operational attribute namespace used for the wireless interfaces.

Such an approach is considered advantageous because the computer-based systems that provide information to the halo devices (or vice versa) may communicate requirements without requiring adapters, conversion, translations, or reformatting. Missions or objectives may be user defined, AI defined, or otherwise created on a computing device (e.g., server, web-based computer, browser-based computer, mobile device, smart phone, cell phone, appliance, etc.). Such missions or objectives may also be stored on a mission server for later retrieval, possibly indexed based on mission type or even location, possibly for reuse in alternative circumstances. For example, a search and rescue drone-based mission may include a set of requirements for longer range, low-bandwidth command and control capability, a short range, high bandwidth mesh networking capability, and a short range, line of sight (e.g., LIDAR, laser-based, etc.) sensor data exchange capability. The search and rescue mission may be stored in the mission server and retrieved when necessary. The mission definition can then be updated or adapted for specific uses based on geography or geolocation to fit the specific need (e.g., adjust altitudes of each layer of the halo device network communication, provide whisker networks, etc.). Thus, various mission or objectives could initially be in the form of a template or form that is fleshed out more completely when needed for real-world deployment. In some embodiments, the mission or objective may be modeled in a virtual environment (e.g., game engine, UnReal®, Unity®, modeling software, etc.) that provides a model of the real-world, possibly including real-world geography. Based on the model, the template's requirements may be fleshed out. Such approaches may be advantageous for search and rescue mission in difficult terrain.

As the mission's or objective's requirements are defined, or are finalized, one or more halo policies may be created or otherwise instantiated, possibly in a server's memory. The halo policies may be created from the operational attributes of the mission or objective. One should appreciate that there might not be a one-to-one correspondence between the required operational attribute requirements of the mission and those available on the halo devices. For example, in the search and rescue example, the available halo devices (e.g., drones) may not support short range wireless interface (e.g., no WiGIG, no Bluetooth, etc.). Thus, the created policy may fulfill the requirements via identifying halo device operational attributes that may serve the same purpose. To continue the example, a fall back to short range wireless interfaces may leverage a medium range wireless interface (e.g., 802.11, etc.) to serve the same purpose, although possibly at a higher power cost. This can be achieved through mapping the required attribute values to those available from the halo device and identifying which halo device wireless interface have attributes that match or satisfy the required attribute value criteria. The satisfaction criteria may be defined in terms of required values, ranges of values, optional values, conditionals defined based on Boolean logic (e.g., AND, OR, XOR, NOR, etc.), or other constraints.

Through matching or mapping the mission or objective requirements defined in the same namespace as the operational attributes of the wireless interface, a vast number of different halo policies may be instantiated to cover various missions or objectives. As discussed previously, a full halo policy provides for bi-directional interactions among multiple devices over multiple wireless interfaces. Each link or channel may provide different capabilities to address the needs of the mission; high bandwidth for bulk data transfer, mesh networks with secure communication via random links, low bandwidth command and control channels, etc. Additionally, a halo policy might also include an aura policy where the halo device radiates signals over wireless interfaces according to the aura policy, possibly operating as a beacon or sensor platform providing data to any other device(s) which is/are within the aura range. In this scenario, an aura device might not be aware of devices receiving its communications; however, other devices will be aware of the aura device. Still further, a halo policy may include a whisker policy that, in some sense, can be considered the inverse of the aura policy where a whisker device listens to incoming signals via the wireless interfaces.

One should appreciate that the different types of halo policies are not mutually exclusive. Rather, it is possible to have multiple types of policies active in a halo communication device at the same time. For example, a mesh network of halo devices may be formed having a halo policy supporting a full network while also deploying a set of halo devices in a long daisy chain. The daisy chained device can be configured to operate as a linear whisker chain according to a whisker portion of the halo policy while also providing data through the chain to the main mesh, which may operate as a backhaul network to remote devices.

The halo policies, when instantiated, include rules and/or software instructions that govern the behavior and operation of the corresponding wireless interfaces. Thus, each halo device may have its wireless interfaces and corresponding networking resources provisioned according to the halo policies. Example techniques that may be adapted for use in provisioning the wireless interfaces and resources (e.g., memory, buffers, channels, wavelengths, bandwidth, time slots, network fabric, routing tables, etc.) are described in U.S. Pat. No. 7,352,745 to Perera et. Al. titled "Switching System with Distributed Switching Fabrics," filed on Dec. 13, 2006. In certain, cases it may be expected that local circumstances may change with time. For example, returning to a search and rescue use case, a fleet of drones may be performing a grid search where the fleet moves in aggregate from one location to another forcing the drones to shift positions both relative to each other and relative to the ground causing the networking links to shift or the roles of the drones to change. Therefore, the instantiated policies may also be dynamic in nature to provide for provisioning, or reprovisioning, the halo devices over the course of their mission or objective. While this approach may be useful in scenarios where the behaviors of the halo devices in their deployed environments may be predictable, it is also possible the environments and/or devices may be unpredictable, which may force the policies to be adaptive in nature. In such cases, the instantiated policies may include instructions for addressing anomalies that are encountered during deployment. For example, one layer of a multi-layer mesh network may fail over to a second layer in the mesh network to maintain a halo integrity. Example techniques that may be adapted for use in detecting anomalies and then taking action include those described in U.S. Pat. No. 8,683,591 to Wittenschlaeger titled "Vector-Based Anomaly Detection," filed on Feb. 9, 2011. Upon detection of an anomaly, the halo policy may cause the halo devices to fall back or fail over to other devices, may cause one policy to replace another, may shift halo devices from one type of halo (e.g., halo, aura, whisker, etc.) to another, or take other actions. Use of anomaly detection provides a clear advantage of handling or managing redundancy, robustness, backfilling, fault tolerance, bandwidth, or other networking capabilities.

While many use cases can leverage the fungibility of halo devices and their halo policies, one should appreciate there is no requirement that all devices working together on a mission or objective have the exact same set of policies as each other. Rather, the collective of halo devices may have a heterogeneous mix of halo policies deployed among the collective. For example, one or more halo devices may form a secure network via a security halo policy where other halo devices may send their data through the secure network without having to encrypt the communications themselves. Example techniques of securing communications through a network that may be leveraged in the halo device use cases include those described in U.S. Pat. No. 7,548,556 to Wittenschlaeger titled "Secure Communication Through a Network Fabric," filed on Jun. 25, 2008. Such techniques are advantageous because they provide for secure communications based on a secure function. For example, while each layer may be secured via a halo policy, the techniques may also be applied to inter-layer communications where the access point (e.g., a specific halo device and specific wireless interface, etc.) from one layer in the network may shift according to a secure function to a different halo device and possibly via a different wireless interface. Thus, bad actors may not be able to track where inter layer communications are to occur, especially when data chunks are spread across the shifting access points.

Another aspect of security includes ensuring that all halo devices serving the same mission or objective can recognize each other, possibly as peer devices or otherwise supporting devices. Given a halo configuration and associated provisioned or instantiated halo policies, a halo device can be configured to broadcast its information securely. This can be achieved by broadcasting a set of signals over two or more wireless interfaces (e.g., 802.11, LoRa, WiGIG, 802.15, laser, etc.) according to a secure function based on a secured key. The set of signals can be considered a signature known to other devices. When a second device receives the set of signals, then it may transmit an acknowledgement, also possibly comprising a set of signals spread over its wireless interfaces. For example, each wireless interface, bands, lasers, or other signal feature may be mapped, possibly via a look-up table, to a bit field. The halo policy can include a hash value or secured key representing the mission key. The bits of the mission key can then be mapped to the corresponding wireless interface signal features thereby giving rise to the ability of a halo device of transmitting a halo-specific secure identification signature to other devices. The information encoded may also include roles, responsibilities, capabilities, locations, or halo-specific mission relevant parameters. The set of signals could vary with time, include chirps or pulses, packets with encoded data interpretable by higher layers in a communication stack, or other information. Thus, the set of signals can be considered as an adapted form of "port knocking" as mapped to wireless interfaces and/or their capabilities.

The previous examples describe an active device. Still, alternatively or in addition to an active device, the halo devices could be provisioned as a whisker device via a corresponding halo policy where the whisker halo device may be passive with respect to communications. Rather than emitting a halo-specific key or signature, whisker devices listen for the halo-specific keys, then activate a corresponding policy assigned to the halo-specific key. For example, solar powered passive devices may be deployed in remote locations, say in the desert, national parks, at sea in buoys, or other locations. When an emergency arises, the devices may be activated to participate in a halo-based network when they receive the proper authentication or authorization activation set of signals or other signatures. Thus, a passive or whisker device may have a set of available halo policies, each indexed or identified by the corresponding halo-specific key. The passive devices may then become a halo device network node, an aura node, a whisker node, a sensor node, or other type of participant in a desired mission or objective.

In view the halo devices can operate or serve as a platform for many different use cases or applications, the form factor of the devices can vary as well. The halo devices can be sized and dimensioned according to possible use cases and typically house the wireless interfaces, but may or may not include corresponding antennas, transmitters, receivers, lasers, or other physical interfaces. Some form factors may physically be restrictive and may only comprise a few wireless interfaces (e.g., a credit card form factor, USB device, etc.) while others may comprise numerous wireless interfaces (e.g., device server, set top box, appliance, etc.). Example form factors may include credit card form factors, device servers, set top boxes, appliances, modular PCBs, game consoles, vehicles, robots, or other types of devices. In more preferred cases, the halo devices may be field replaceable, possibly a module or adapter, where it can be plugged into a larger device (e.g., vehicle, appliance, repeater, routers, etc.). Thus, the halo device can be considered a halo adapter. Such approaches are considered advantageous because the halo adapters may be included within larger devices for use in specific applications thereby ensuring the larger devices may operate in an optimized fashion. For example, minimal halo devices having two wireless interfaces, say 802.11 and LoRa (for example), may be deployed in drones thereby ensuring power usage is otherwise minimized for wireless communications. In a vehicle, more complex halo devices having many wireless interfaces may be used when more power is available for the interfaces, possibly for creating emergency networks among emergency vehicles through an urban landscape.

Some use cases, possibly in military use cases, the halo devices may need to be secured against possible damage due to electromagnetic pulses (EMPs) to retain communication capabilities. In such cases the halo device may be housed in a Faraday cage to protect the core halo device from the EMP. Ordinarily the physical interfaces (e.g., antenna, etc.) may be vulnerable points for EMPs. However, the Faraday cage may include electrically isolated ports through which the halo device is able to couple with external physical interfaces. The ports may include physical ports or even a hole. For example, the halo device may include a modulated laser wireless interface, which is able to receive or transmit via laser through the port to an external antenna. Thus, a modulated laser, possibly a thin-film lithium niobate device, can operate as a bridge through the Faraday enclosure between an external RF module and the internal halo device.

Numerous possible use cases are possible given the halo device capabilities. Consider a use case with a robot or fleet of robots. A robot (e.g., a humanoid, an autonomous vehicle, etc.) may comprise multiple individual articulating parts benefiting from wireless inter communications without requiring wires, which could become damaged or wear out during movement. The halo devices can be disposed within each part of the robot (e.g., wheels, legs, arms, appendages, torso or core, chassis, tools, batteries, motors, servos, sensors, modules, etc.). A corresponding halo can be defined allowing the halo devices to form one or more robot area networks (RANs). A RAN halo policy can provision a management network possibly operating over a WiGIG network where each halo device communicates with a core management module possibly disposed in a chassis, core, or torso of the body. The halo policy may also provision a daisy chain network via Bluetooth so that each neighboring halo device disposed in the appendages may directly communicate information with each other or peripherals (e.g., tools, sensors, external networks, etc.). Still further, in the case of a fleet of robots where the robots must coordinate activities, the halo policy may provision a mesh network, possibly based on 802.11 or LoRa, among the robots to fulfill a mission or objective as a collective. For such cases, the halo policy may be organized as a hierarchy where the daisy chain network may communicate with the WIGIG RAN and where the WiGIG RAN may communicate with the wide area robot fleet LoRa network.

In a similar vein as the robot use cases, albeit possibly with less movement, the halo devices may also be coupled with modular LED panels or display walls. The LED panels may be equipped with halo devices where the halo devices provide a halo having a network among the LED panels or display wall for delivering content over a high bandwidth network while also providing a low bandwidth network for command and/or control. A specific use case can include equipping modular LED display walls with halo devices for use in constructing movie or production filming volumes. Example LED walls for movie production are described in U.S. Pat. No. 12,523,358 to Marshall et. Al. titled "Modular LED Wall Apparatus, Systems, and Methods," filed Oct. 24, 2024. Each modular wall or LED panel may be provisioned with a halo device, possibly where the halo device is field replaceable.

In more dynamic settings halo devices may move relative to each other or relative to specific locations at various speeds. For example, the halo devices may be deployed in UAVs or other mobile platforms (e.g., vehicles, airplanes, automobiles, trucks, law mowers, construction equipment, tanks, boats, ships, etc.) that may coordinate activities for a mission or objective via corresponding halo policies. In such cases and in view that some UAVs may be able to move in three dimensions, the UAVs may communicate with each other via halos constructed in a 3D shape around each UAV. Thus, the UAVs may communicate via a network at a common elevation as well as at various altitudes according to a corresponding halo policy for a mission or objective, which gives rise to many possible interesting policy-based missions or objectives. In cases where UAVs operate at different altitudes, the halo policies may take into account altitude or elevation in their provisioning. Such approaches are advantageous because there may be physical features (e.g., mountains, buildings, trees, etc.) that may interfere with communications otherwise. In such cases, the halo policies may incorporate line of sight lasers (e.g., TFLN modulated lasers, etc.), for example for low elevations enabling RF via laser without interfering with RF communications in the same bands. Further, the UAVs may also provide for uplinks or downlinks via high bandwidth communications with satellites.

Halo policies offer a wide range of capabilities for halo devices to communicate with each other or with external devices based on missions or objectives. Additionally, one should appreciate the missions or objectives may also be bound to a specific location where halo devices may move into or out of areas around the location. Therefore, in some embodiments, the halo policies may be identified or indexed by location information possibly including geofences, zip codes, S2 cells (see URL s2geometry.io), GPS coordinates, longitude and/or latitude, Google Plus codes, what3words, etc.). Halo devices having a GPS unit may use GPS data to generate a corresponding location identifier or coordinate via an implementation of a geolocation library or function. As halo devices enter (or exit) an area a halo policy, or a portion thereof, may be activated or instantiated thereby configuring the halo device to participate in the mission or objective at that location. When fine grained control over policies is required, use of S2 cell geometries may be employed to identify required halo policies rather than more coarse grained locations such as zip codes or geofence areas. Fine grained provisioning of halo policies can provide for high fidelity sensing or communications where infrastructure is lacking, possibly including remote areas, deserts, wilderness, disaster areas, archeology sites, military action locations, or other areas where communications may be dark.

In some embodiments, each provisioned halo policy may also include network monitoring or management functionalities. Such management functionalities may include monitoring, inventory management, logging, alerting, reporting, recovery, security, (e.g., MILARRS) or other network management functionalities. Example techniques or devices that may be leveraged or adapted to incorporate network management features into a halo devices are described in U.S. Pat. No. 8,504,740 to Brown et. Al. titled "MILARRS Systems and Methods," filed Jun. 12, 2012. In such cases, the halo devices may incorporate a virtual module possibly operating as an adapter to provide network management capabilities to remote devices. Still further, each halo policy may include software instructions or code that instantiates a virtual network monitoring agent capable of providing network management services to the halo device itself, its halo members, or to remote devices possibly operating as a manager device. In some scenarios, SNMP may be used to collect or report networking information. However, for halo device or halo management a typical implementation of SNMP may not provide sufficient coverage for halo management. Thus, there is a need for monitoring or management of halo parameters to track or manage halo-specific features, possibly defined based on the operational attributers of the halo (e.g., range, wavelength, anomalies, interfaces, bandwidth, errors, traffic, faults, halo integrity, halo faults, whisker range, halo link ranges, etc.). Example techniques that may be adapted for mapping halo device or halo behaviors data to halo events are described in U.S. Pat. No. 12,058,214 to Soon-Shiong et. Al. titled "Fine Grained Network Management to Edge Device Features," filed Jun. 28, 2022, the content of which is herein incorporated by reference in its entirety for all purposes. In such cases, the halo policies may further include the definitions of halo events to be managed, where the halo events may be defined at the halo device level, the halo-layer level, or event at a mission or objective level so that a mission or objective manager (e.g., remote server, etc.) may have situational awareness of the mission or objective over time. In more specific implementations, OpenNMS may be used for halo monitoring or management. The individual halo devices or halo manager device (e.g., a halo device assigned to manage an instantiated halo or halo layer) may instantiate an OpenNMS minion that collects or tracks defined halo behaviors and provides the information back to the OpenNMS dashboard (e.g., Grafana, HELM, etc.). Thus, one aspect of the inventive subject matter is considered to include mapping halo behaviors at any halo level to one or more MIBs, where the halo behaviors may be mapped to one or more operation attribute values individually or collectively.

In view the disclosed halo device platform may serve many use cases that may be critical, there is a need for tracking the performance or other behaviors of the halo devices during a mission or objective. Therefore, some embodiments employ tracking halo devices or halos in general (e.g., halos, auras, whiskers, etc.) via notarized ledgers. For example, at the launch of a mission or objective the corresponding halo policies may be recorded on one or more ledger. As the mission evolves each action taken or event detected, possibly via an OpenNMS minions or other event monitoring module, such events may also be recorded on the ledger. Recording data on the ledger may include actually storing the complete data on the ledger or recording a transaction on the ledger having a pointer or link to the data at an off ledger location possibly via a DOI, GUID, ULR, URI, file handle, hash address, or other type of data pointer. Further, in some cases, a genesis block for the ledger may be generated for the mission or objective. Such an approach is advantageous because having a mission or objective halo specific ledger provides for higher security, which may be necessary for military applications. Additionally or alternatively, the mission specific ledger may be a side chain stored off of a main ledger, possibly represented as a digital token (e.g., a non-fungible token, etc.) on the main ledger. Example techniques for representing secured or private data via digital tokens that may be adapted for use with the disclosed halo platform are described in U.S. Pat. No. 11,880,824 to Witchey et. Al. titled "Managing Digital Blockchains via Digital Tokens, Systems, Methods, and Apparatus," filed Apr. 6, 2023, the content of which is herein incorporated by reference in its entirety for all purposes. For example, in a public search and rescue mission, an NFT on a public ledger may be minted to represent the mission. The NFT may include or may point to a public data store, say a fire department's web site or mission log, where information about the mission may be found including halo policies, halo device operational parameters, mission requirements, location, mission events, or other mission or halo related information. As significant events take place, the NFT owner address may be updated to reflect changes of mission state (e.g., mission defined, mission start, mission updates, mission closed, etc.). Example notarized ledgers that may be adapted for use include Solana, Ethereum, BitCoin, Cardano, Hashgraph, Hyperledger Fabric, R3 Corda, Ripple Ledger, BigChainDB, ChainPoint, or other types of ledgers. The ledgers may include private ledgers, semi-private ledgers, public ledgers, directed acyclic graphs, immutable ledgers, or other types of ledger technologies.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a wireless halo device comprising: at least one computer readable non-transitory memory storing software instructions; a plurality of wireless interfaces wherein each wireless interface corresponds to a different wireless frequency band; and at least one processor coupled with the at least one memory and the plurality of wireless interface, and that perform the following operations upon execution of the software instructions: instantiating a communication halo policy for the plurality of wireless interfaces in the at least one memory, the communication halo policy including: a peer device handshake protocol over at least some interfaces of the plurality of wireless interfaces; connection bandwidth criteria over the plurality of wireless interfaces; connection range criteria over the plurality of wireless interfaces; and transmission constraints over the plurality of wireless interfaces; establishing a connection with at least one peer device via the plurality of wireless interface based on the peer device handshake protocol and satisfying the bandwidth connection criteria and the range connection criteria; and exchanging at least one data packet over the connection via the plurality of wireless interfaces according to the transmission constraints.

Example 2 is the wireless halo device of example 1, wherein the different wireless frequency bands of the plurality of wireless interfaces include non-overlapping frequencies bands.

Example 3 is the wireless halo device of example 1, wherein each wireless interface of the plurality of wireless interfaces couples with an antenna responsive to a frequency band of the wireless interface.

Example 4 is the wireless halo device of example 3, further comprising the antenna.

Example 5 is the wireless halo device of example 3, further comprising a housing that houses the at least one processor, wherein the antenna is external to the housing.

Example 6 is the wireless halo device of example 1, wherein the communication halo policy comprises a session-based communication policy.

Example 7 is the wireless halo device of example 1, wherein the connection bandwidth criteria comprise a provisioned bandwidth requirement.

Example 8 is the wireless halo device of example 1, wherein the connection range criteria comprise a provisioned link range requirement.

Example 9 is the wireless halo device of example 1, wherein the plurality of wireless interfaces include at least two interfaces supporting at least two of the following: LoRa, W-USB, Bluetooth, Bluetooth Low Energy, WiGIG, WiFi, Zigbee, Z-Wave, Free spectrum 3.5 GHz, L-band (1-2 GHz), S-band (2-4 GHz), C-band (4-8 GHz), X-band (8-12 GHz), Ku-band (12-18 GHz), Ka-band (26-40 GHz), V-band (40-75 GHz), or E-band (71-86 GHz).

Example 10 is the wireless halo device of example 1, wherein the plurality of wireless interfaces includes at least one light-based interface.

Example 11 is the wireless halo device of example 10, wherein the at least one light-based interface supports at least one of the following: infrared light, visible light, and ultraviolet light.

Example 12 is the wireless halo device of example 10, wherein the at least one light-based interface comprises a laser-based interface.

Example 13 is the wireless halo device of example 1, wherein the communication halo policy comprises a halo mesh network policy.

Example 14 is the wireless halo device of example 13, wherein the connection range criteria includes a tight mesh network having short range criteria.

Example 15 is the wireless halo device of example 13, wherein the connection range criteria includes a loose mesh network having long range criteria.

Example 16 is the wireless halo device of example 1, wherein the connection range criteria includes at least a first range criterion requiring a first link within 1 meter.

Example 17 is the wireless halo device of example 16, wherein the connection range criteria includes at least a second range criterion requiring a second link within 10 meters.

Example 18 is the wireless halo device of example 17, wherein the connection range criteria includes at least a third range criterion requiring a third link within at least 100 meters.

Example 19 is the wireless halo device of example 18, wherein the connection range criteria includes at least a fourth range criterion requiring a fourth link within at least 1000 meters.

Example 20 is the wireless halo device of example 19, wherein the connection range criteria includes at least a fifth range criterion requiring a fifth link within 10000 meters.

Example 21 is the wireless halo device of example 1, wherein the connection range criteria includes at least one location criterion.

Example 22 is the wireless halo device of example 21, wherein the at least one location criterion depends on one of the following: a geolocation, a geofenced area, an S2 cell, and a zip code.

Example 23 is the wireless halo device of example 1, wherein the halo wireless device comprises at least one of the following: a repeater, a router, a base station, a vehicle, a set top box, an appliance, a phone, a wearable device, a biometric device, a personal area network (PAN) device, and a game console.

Example 24 is the wireless halo device of example 1, wherein the wireless halo device comprises a credit card form factor.

Example 25 is the wireless halo device of example 1, wherein the wireless halo device comprises at least one location sensor.

Example 26 is the wireless halo device of example 25, wherein the at least one location sensor comprises a GPS sensor.

Example 27 is the wireless halo device of example 1, wherein the at least one peer device comprises a second wireless halo device.

Example 28 is the wireless halo device of example 1, wherein the connection with the at least one peer device comprises a direct wireless link.

Example 29 is the wireless halo device of example 1, wherein the connection with the at least one peer device comprises an indirect wireless link.

Example 30 is the wireless halo device of example 29, wherein the connection via indirect link is via at least one intermediary device.

Example 31 is the wireless halo device of example 1, wherein the connection comprises a heartbeat protocol associated with the transmission constraints.

Example 32 is the wireless halo device of example 31, wherein the connection bandwidth criteria includes a low-bandwidth data rate assigned to the heartbeat protocol.

Example 33 is the wireless halo device of example 32, wherein the low-bandwidth data rate is less than 1000 bps.

Example 34 is the wireless halo device of example 1, wherein the connection comprises multiple links across the plurality of wireless interfaces.

Example 35 is the wireless halo device of example 34, wherein the connection bandwidth criteria includes at least one aggregated bandwidth criterion requiring more than one wireless link.

Example 36 is the wireless halo device of example 1, wherein the peer device handshake protocol requires at least two links across the plurality of wireless interfaces.

Example 37 is the wireless halo device of example 1, wherein the peer device handshake protocol comprises a beacon protocol.

Example 38 is the wireless halo device of example 1, wherein the peer device handshake protocol includes a discovery protocol over the plurality of wireless interfaces.

Example 39 is the wireless halo device of example 38, wherein operations further include receiving peer device properties in response to the peer device handshake protocol.

Example 40 is the wireless halo device of example 39, wherein the peer device properties include at least one of the following: an available bandwidth, an available data rate, an available range, an available compute bandwidth, and provisionable services.

Example 41 is the wireless halo device of example 1, wherein the communication halo policy comprises an aura policy.

Example 42 is the wireless halo device of example 41, wherein the transmission constraints of the aura policy only permits transmitting the at least one data packet.

Example 43 is the wireless halo device of example 41, wherein the transmission constraints of the aura policy only permits receiving the at least one data packet.

Example 44 is the wireless halo device of example 1, wherein the communication halo policy comprises a whisker policy.

Example 45 is the wireless halo device of example 44, wherein the transmission constraints of the whisker policy include sensing criteria across the plurality of wireless interfaces.

Example 46 is a method comprising instantiating a communication halo policy for a plurality of wireless interfaces in at least one memory, wherein each wireless interface corresponds to a different wireless frequency band, the communication halo policy including: a peer device handshake protocol over at least some interfaces of the plurality of wireless interfaces; connection bandwidth criteria over the plurality of wireless interfaces; connection range criteria over the plurality of wireless interfaces; and transmission constraints over the plurality of wireless interfaces; establishing a connection with at least one peer device via the plurality of wireless interface based on the peer device handshake protocol and satisfying the bandwidth connection criteria and the range connection criteria; and exchanging at least one data packet over the connection via the plurality of wireless interfaces according to the transmission constraints.

Example 47 is one or more non-transitory computer-readable storage media storing instructions that, upon execution by one or more processors of a system, cause the system to perform operations comprising: instantiating a communication halo policy for a plurality of wireless interfaces in at least one memory, wherein each wireless interface corresponds to a different wireless frequency band, the communication halo policy including: a peer device handshake protocol over at least some interfaces of the plurality of wireless interfaces; connection bandwidth criteria over the plurality of wireless interfaces; connection range criteria over the plurality of wireless interfaces; and transmission constraints over the plurality of wireless interfaces; establishing a connection with at least one peer device via the plurality of wireless interface based on the peer device handshake protocol and satisfying the bandwidth connection criteria and the range connection criteria; and exchanging at least one data packet over the connection via the plurality of wireless interfaces according to the transmission constraints.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A wireless halo device comprising:

at least one computer readable non-transitory memory storing software instructions;

a plurality of wireless interfaces wherein each wireless interface corresponds to a different wireless frequency band; and at least one processor coupled with the at least one memory and the plurality of wireless interface, and that perform the following operations upon execution of the software instructions:

instantiating a communication halo policy for the plurality of wireless interfaces in the at least one memory, the communication halo policy including:

a peer device handshake protocol over at least some interfaces of the plurality of wireless interfaces;

connection bandwidth criteria over the plurality of wireless interfaces;

connection range criteria over the plurality of wireless interfaces; and transmission constraints over the plurality of wireless interfaces;

establishing a connection with at least one peer device via the plurality of wireless interface based on the peer device handshake protocol and satisfying the bandwidth connection criteria and the range connection criteria; and exchanging at least one data packet over the connection via the plurality of wireless interfaces according to the transmission constraints.

2. The wireless halo device of claim 1, wherein the different wireless frequency bands of the plurality of wireless interfaces include non-overlapping frequencies bands.

3. The wireless halo device of claim 1, wherein each wireless interface of the plurality of wireless interfaces couples with an antenna responsive to a frequency band of the wireless interface.

4. The wireless halo device of claim 3, further comprising the antenna.

5. The wireless halo device of claim 1, wherein the communication halo policy comprises a session-based communication policy.

6. The wireless halo device of claim 1, wherein the connection bandwidth criteria comprise a provisioned bandwidth requirement.

7. The wireless halo device of claim 1, wherein the connection range criteria comprise a provisioned link range requirement.

8. The wireless halo device of claim 1, wherein the plurality of wireless interfaces include at least two interfaces supporting at least two of the following: LoRa, W-USB, Bluetooth, Bluetooth Low Energy, WiGIG, WiFi, Zigbee, Z-Wave, Free spectrum 3.5 GHz, L-band (1-2 GHz), S-band (2-4 GHz), C-band (4-8 GHz), X-band (8-12 GHz), Ku-band (12-18 GHz), Ka-band (26-40 GHz), V-band (40-75 GHz), or E-band (71-86 GHz).

9. The wireless halo device of claim 1, wherein the plurality of wireless interfaces includes at least one light-based interface.

10. The wireless halo device of claim 9, wherein the at least one light-based interface supports at least one of the following: infrared light, visible light, laser light, and ultraviolet light.

11. The wireless halo device of claim 1, wherein the communication halo policy comprises a halo mesh network policy.

12. The wireless halo device of claim 1, wherein the connection range criteria includes at least a first range criterion requiring a first link within 1 meter.

13. The wireless halo device of claim 12, wherein the connection range criteria includes at least a second range criterion requiring a second link within 10 meters.

14. The wireless halo device of claim 1, wherein the connection range criteria includes at least one location criterion.

15. The wireless halo device of claim 14, wherein the at least one location criterion depends on one of the following: a geolocation, a geofenced area, an S2 cell, and a zip code.

16. The wireless halo device of claim 1, wherein the wireless halo device comprises a credit card form factor.

17. The wireless halo device of claim 1, wherein the wireless halo device comprises at least one location sensor.

18. The wireless halo device of claim 1, wherein the connection comprises a heartbeat protocol associated with the transmission constraints.

19. The wireless halo device of claim 1, wherein the connection comprises multiple links across the plurality of wireless interfaces.

20. The wireless halo device of claim 1, wherein the peer device handshake protocol requires at least two links across the plurality of wireless interfaces.

* * * * *